US011550323B2

(12) United States Patent
Kajiyama et al.

(10) Patent No.: US 11,550,323 B2
(45) Date of Patent: Jan. 10, 2023

(54) AUTONOMOUS MOVING APPARATUS AND NON-TRANSITORY COMPUTER READABLE MEDIUM STORING PROGRAM

(71) Applicant: FUJIFILM BUSINESS INNOVATION CORP., Tokyo (JP)

(72) Inventors: Hajime Kajiyama, Kanagawa (JP);
Mariko Miyazaki, Kanagawa (JP);
Hideki Fujimoto, Kanagawa (JP);
Tetsuya Kobayashi, Kanagawa (JP);
Xiongfan Jin, Kanagawa (JP);
Kunitoshi Yamamoto, Kanagawa (JP);
Teppei Aoki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 408 days.

(21) Appl. No.: 16/662,111

(22) Filed: Oct. 24, 2019

(65) Prior Publication Data
US 2020/0142412 A1    May 7, 2020

(30) Foreign Application Priority Data
Nov. 7, 2018    (JP) .............................. JP2018-209419

(51) Int. Cl.
*G05D 1/00*    (2006.01)
*G05D 1/02*    (2020.01)

(52) U.S. Cl.
CPC ......... *G05D 1/0088* (2013.01); *G05D 1/0212* (2013.01); *G05D 1/0231* (2013.01);
(Continued)

(58) Field of Classification Search
CPC .. G05D 1/0088; G05D 1/0212; G05D 1/0223; G05D 1/0231; G05D 1/0255; G05D 1/0276; G05D 2201/0213
See application file for complete search history.

(56) References Cited

U.S. PATENT DOCUMENTS 5,324,948 A * 6/1994 Dudar ................. G05D 1/0221
250/379
2004/0199292 A1* 10/2004 Sakagami .............. G06N 3/008
700/259
(Continued)

FOREIGN PATENT DOCUMENTS

| JP | 2000-113399 A | 4/2000 |
| JP | 2006-185239 A | 7/2006 |
| JP | 2015-210661 A | 11/2015 |

OTHER PUBLICATIONS https://www.youtube.com/watch?v=R5VuTwT2gv4 (Year: 2017).*
Aug. 30, 2022 Office Action issued in Japanese Application No. 2018-209419.

*Primary Examiner* — Behrang Badii
*Assistant Examiner* — Matthew J. Reda
(74) *Attorney, Agent, or Firm* — Oliff PLC

(57) ABSTRACT

An autonomous moving apparatus includes a moving unit moving the apparatus, a detector detecting distances from surrounding objects and shapes of the objects, and a controller. When a route of the apparatus is adjusted to a route of a follow target under control of the moving unit, the controller controls the moving unit so that the apparatus continues to move without changing the route of the apparatus if the follow target has changed the route but an obstacle having a possibility of causing a movement abnormality when the apparatus moves over the obstacle is present between the route of the follow target and the route of the apparatus. When the obstacle is no longer present between the route of the follow target and the route of the apparatus, the controller controls the moving unit so that the route of the apparatus is adjusted to the route of the follow target.

15 Claims, 25 Drawing Sheets

(52) U.S. Cl.
CPC ......... *G05D 1/0255* (2013.01); *G05D 1/0276* (2013.01); *G05D 2201/0213* (2013.01)

(56) References Cited

U.S. PATENT DOCUMENTS

| | | | |
|---|---|---|---|
| 2012/0185094 A1* | 7/2012 | Rosenstein | G05D 1/0272 |
| | | | 901/1 |
| 2018/0024564 A1* | 1/2018 | Matsuda | G05D 1/0278 |
| | | | 701/25 |
| 2018/0132966 A1* | 5/2018 | Desaulniers | A61B 90/50 |
| 2018/0329418 A1* | 11/2018 | Baalke | G05D 1/024 |
| 2019/0129419 A1* | 5/2019 | Lee | G05D 1/0088 |
| 2019/0359208 A1* | 11/2019 | Sapp | G06V 20/584 |
| 2021/0213948 A1* | 7/2021 | Lahti | B60W 30/146 |

* cited by examiner

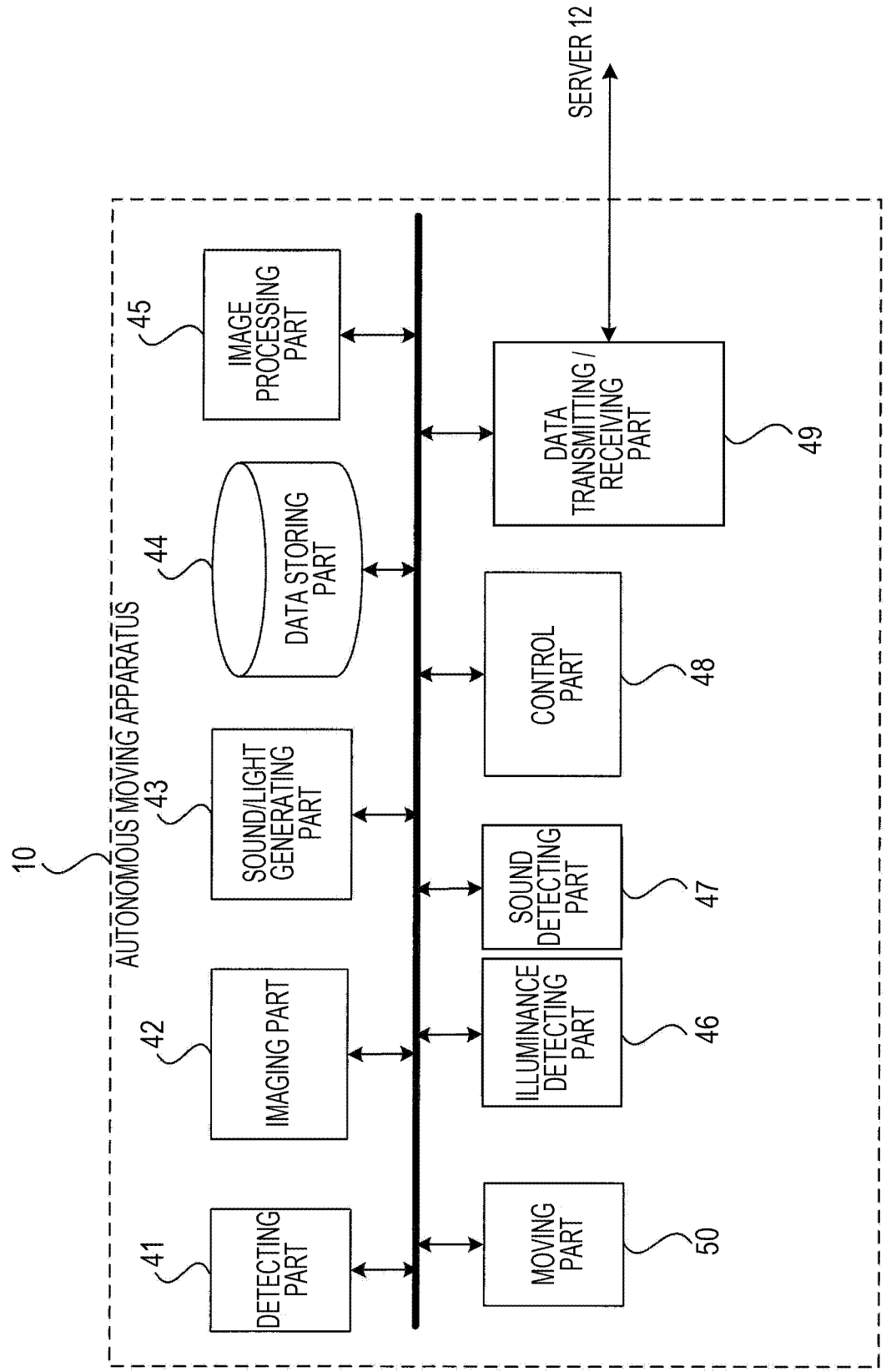

AUTONOMOUS MOVING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-209419 filed Nov. 7, 2018.

BACKGROUND

(i) Technical Field

The present disclosure relates to an autonomous moving apparatus and a non-transitory computer readable medium storing a program.

(ii) Related Art

Japanese Unexamined Patent Application Publication No. 2000-113399 discloses an automatic follow system that achieves high-speed and high-accuracy tandem follow movement along a movement path of a leading car.

SUMMARY

Aspects of non-limiting embodiments of the present disclosure relate to an autonomous moving apparatus and a non-transitory computer readable medium storing a program, in which the autonomous moving apparatus may continue to follow a follow target without a movement abnormality if the autonomous moving apparatus attempts to follow the follow target by adjusting a route of the autonomous moving apparatus to a route of the follow target but the follow target has changed the route over an obstacle having a possibility of causing the movement abnormality when the autonomous moving apparatus moves over the obstacle.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an autonomous moving apparatus comprising a moving unit that moves the autonomous moving apparatus, a detector that detects distances from surrounding objects and shapes of the surrounding objects, and a controller that controls the moving unit. When a route of the autonomous moving apparatus is adjusted to a route of a follow target under control of the moving unit, the controller controls the moving unit so that the autonomous moving apparatus continues to move without changing the route of the autonomous moving apparatus if the follow target has changed the route but an obstacle having a possibility of causing a movement abnormality when the autonomous moving apparatus moves over the obstacle is present between the route of the follow target and the route of the autonomous moving apparatus. When the obstacle is no longer present between the route of the follow target and the route of the autonomous moving apparatus, the controller controls the moving unit so that the route of the autonomous moving apparatus is adjusted to the route of the follow target.

BRIEF DESCRIPTION OF THE DRAWINGS

An exemplary embodiment of the present disclosure will be described in detail based on the following figures, wherein:

FIG. 4 is a block diagram illustrating the functional configuration of the autonomous moving apparatus of the exemplary embodiment of the present disclosure;

DETAILED DESCRIPTION

An exemplary embodiment of the present disclosure is described in detail with reference to the drawings.

Figure 1:
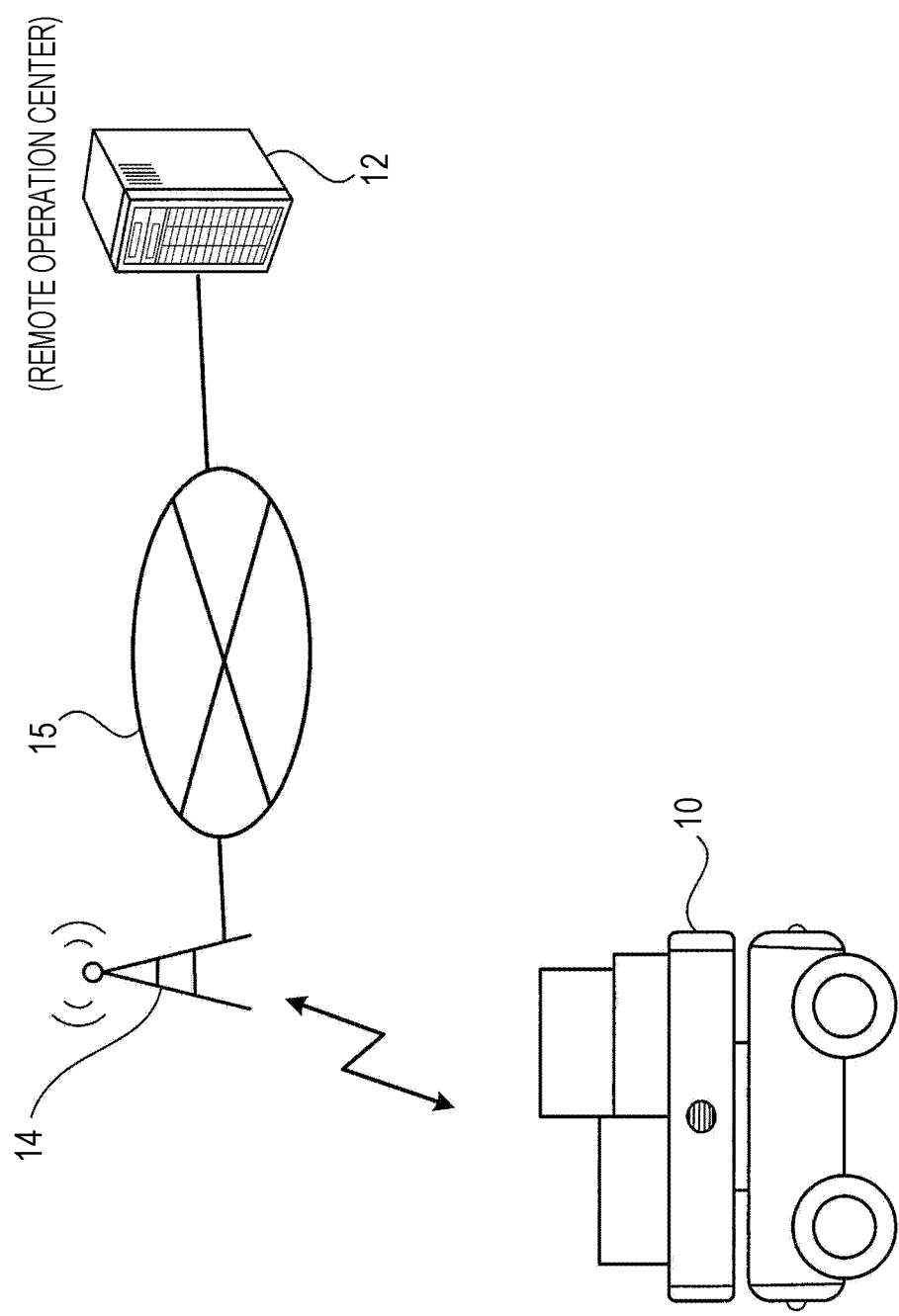
FIG. 1 illustrates the configuration of a system that uses an autonomous moving apparatus of an exemplary embodiment of the present disclosure.

FIG. 1 illustrates the configuration of a system that uses an autonomous moving apparatus 10 of the exemplary embodiment of the present disclosure.

As illustrated in FIG. 1, the system that uses the autonomous moving apparatus 10 of the exemplary embodiment of the present disclosure includes the autonomous moving apparatus 10 and a server 12 installed in a remote operation center where the autonomous moving apparatus 10 is remotely operated.

For example, the autonomous moving apparatus 10 and the server 12 are mutually connected via a cellular communication network 14 and the Internet 15.

The autonomous moving apparatus 10 transmits and receives data and the like between the autonomous moving apparatus 10 and the cellular communication network 14. The autonomous moving apparatus 10 includes a moving unit that moves the autonomous moving apparatus. The moving unit enables the autonomous moving apparatus to autonomously move so as to follow movement of a follow target 1 corresponding to a person to be followed. The term "follow" means that the autonomous moving apparatus autonomously moves ahead of or behind the recognized follow target 1 in response to the movement of the follow target 1.

Specifically, the autonomous moving apparatus 10 may detect motion of hands and legs of the follow target 1 to operate in any operation mode out of a follow mode in which the autonomous moving apparatus 10 moves behind the follow target 1, a lead mode in which the autonomous moving apparatus 10 moves ahead of the follow target 1, and a stop mode in which the autonomous moving apparatus 10 stops its movement.

The follow mode is an operation mode in which the autonomous moving apparatus 10 moves behind the leading follow target. The lead mode is an operation mode in which the autonomous moving apparatus 10 moves ahead of the follow target.

The autonomous moving apparatus 10 is provided with a follow mode button, a lead mode button, and a stop button. A user may switch the operation modes of the autonomous moving apparatus 10 by operating those buttons.

This exemplary embodiment is described taking an example in which the autonomous moving apparatus 10 includes a carriage, the carriage is loaded with a package such as a packing box, and the autonomous moving apparatus 10 moves ahead of or behind the follow target 1 such as a delivery person who collects and delivers the package or stops the movement.

Figure 2:
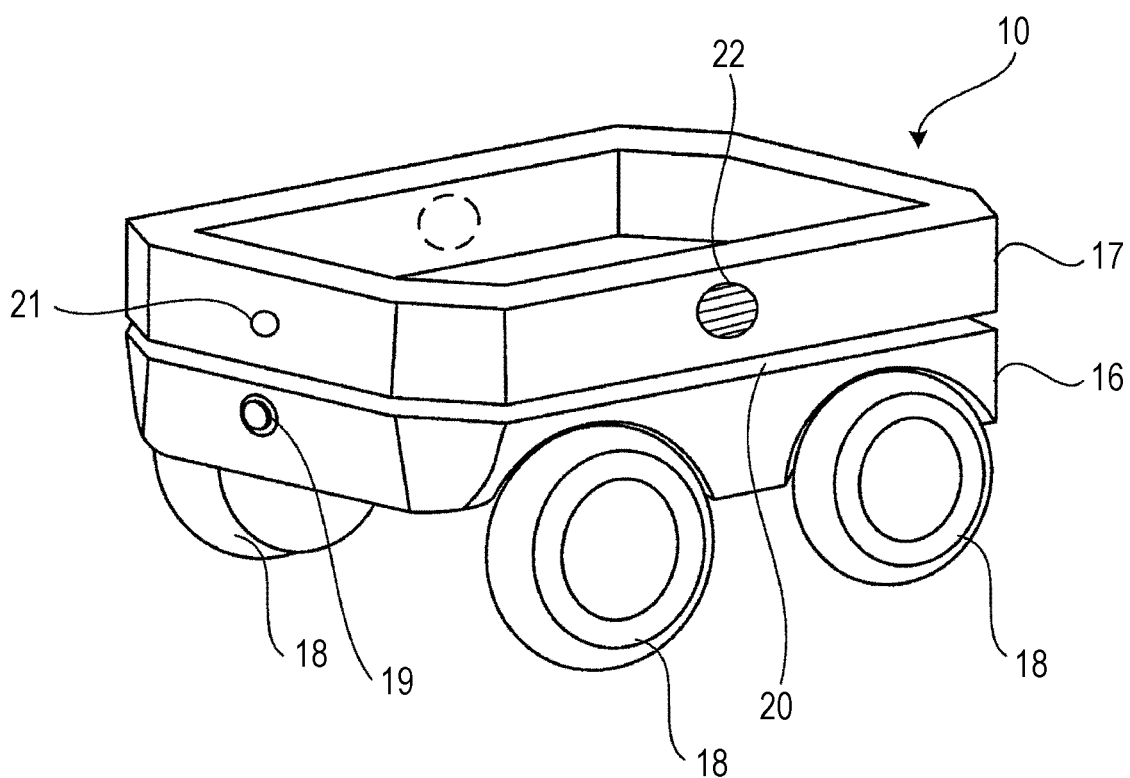
FIG. 2 is a perspective view illustrating an appearance of the autonomous moving apparatus of the exemplary embodiment of the present disclosure.

Next, the structure of the autonomous moving apparatus 10 is described. FIG. 2 is a perspective view illustrating an appearance of the autonomous moving apparatus 10.

The autonomous moving apparatus 10 includes an apparatus body 16, a carriage 17, moving mechanisms 18 that move the apparatus body 16, cameras 19 serving as an imaging unit, a sensor 20 serving as a detector, LED indicators 21, and loudspeakers 22.

The carriage 17 is provided above the apparatus body 16 and is loaded with a package such as a packing box.

The camera 19 captures a surrounding image, in particular, an image of the feet of the follow target. Two cameras 19 are provided on the front and rear of the apparatus body 16.

The sensor 20 is provided between the apparatus body 16 and the carriage 17 and detects distances from and shapes of objects located in 360 degrees around the autonomous moving apparatus. Specifically, the sensor 20 is a laser rangefinder (laser distance sensor) that detects a distance from an object by using laser light and detects distances from and shapes of objects located around the autonomous moving apparatus by using a technology called Laser Imaging, Detection, and Ranging (LIDAR).

Two LED indicators 21 are provided on the front and rear of the apparatus body 16 and notify the follow target of some information by emitting light. Two loudspeakers 22 are provided on the right and left of the apparatus body 16 and notify the follow target of some information by emitting sound.

The moving mechanisms 18 are provided below in lower portions of the apparatus body 16 and cause the autonomous moving apparatus to move so as to follow movement of the follow target 1 that is detected by the camera 19 and the sensor 20. Specifically, the moving mechanism 18 includes a wheel, a motor serving as a drive source that drives the wheel, and an actuator and a hydraulic pump that control a steering angle and a brake of a steered wheel.

Figure 3:
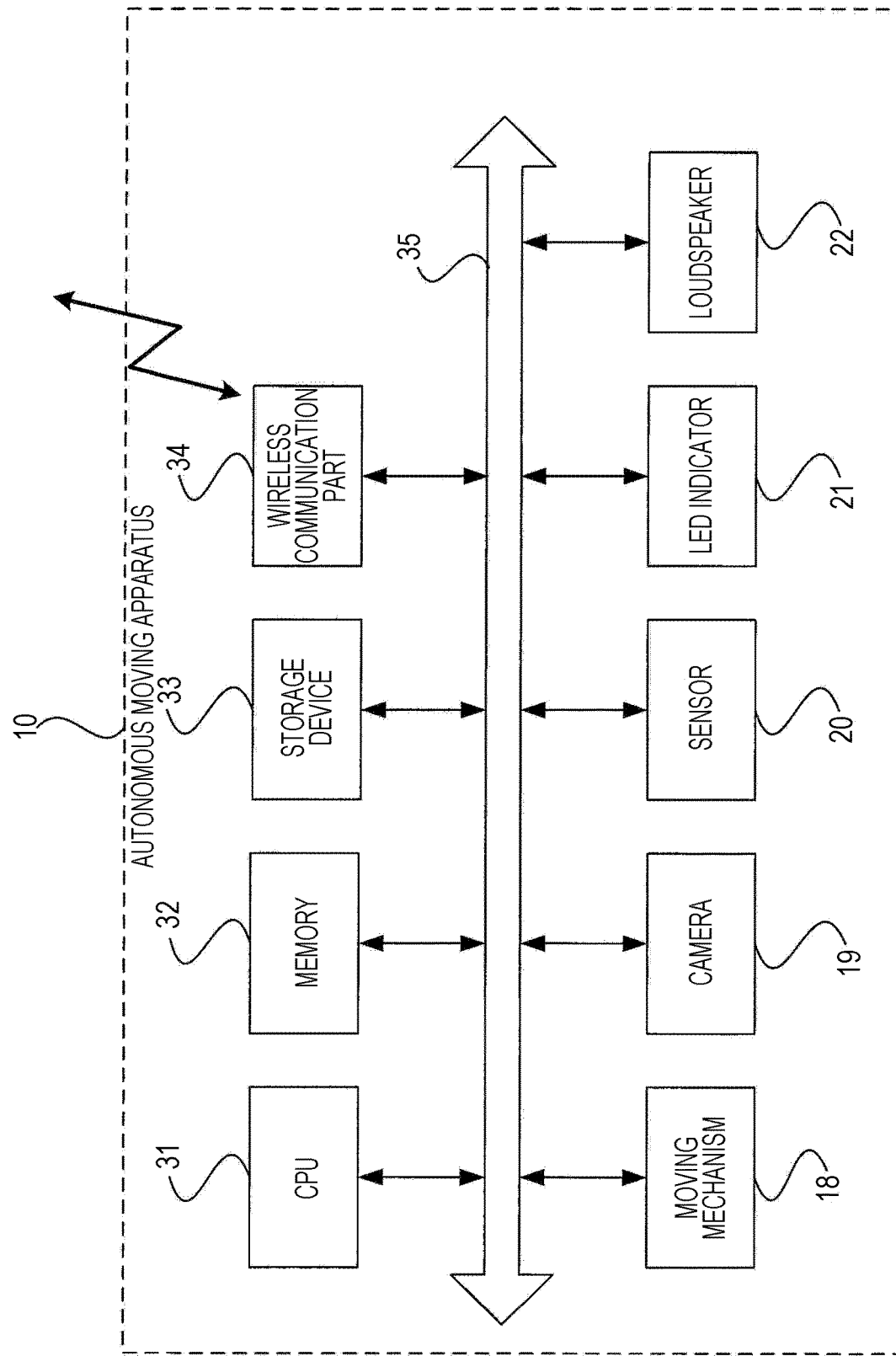
FIG. 3 is a block diagram illustrating the hardware configuration of the autonomous moving apparatus of the exemplary embodiment of the present disclosure.

FIG. 3 is a block diagram illustrating the hardware configuration of the autonomous moving apparatus 10.

As illustrated in FIG. 3, the autonomous moving apparatus 10 includes a CPU 31, a memory 32, a storage device 33, a wireless communication part 34, the moving mechanism 18, the camera 19, the sensor 20, the LED indicator 21, and the loudspeaker 22. Those components are connected together via a control bus 35.

The CPU 31 executes predetermined processing based on a control program stored in the memory 32 or the storage device 33 to control an operation of the autonomous moving apparatus 10. The wireless communication part 34 transmits and receives data between the wireless communication part 34 and the cellular communication network 14 via a wireless network. This exemplary embodiment is described under the assumption that the CPU 31 reads and executes the control program stored in the memory 32 or the storage device 33 but the program may be provided to the CPU 31 by being stored in a storage medium such as a CD-ROM.

The sensor 20 includes not only the laser rangefinder described above but also a sound sensor that detects ambient sound and an illuminance sensor that detects ambient illuminance.

FIG. 4 is a block diagram illustrating the functional configuration of the autonomous moving apparatus 10 that is implemented by executing the control program described above.

As illustrated in FIG. 4, the autonomous moving apparatus 10 of this exemplary embodiment includes a detecting part 41, an imaging part 42, a sound/light generating part 43, a data storing part 44, an image processing part 45, an illuminance detecting part 46, a sound detecting part 47, a control part 48, a data transmitting/receiving part 49, and a moving part 50.

The data transmitting/receiving part 49 transmits and receives data between the data transmitting/receiving part 49 and the server 12 based on control of the control part 48.

The detecting part 41 detects distances from and shapes of surrounding objects. Specifically, the detecting part 41 detects distances from and shapes of objects near the ground on the periphery, including the feet of the follow target 1.

Figure 5A:
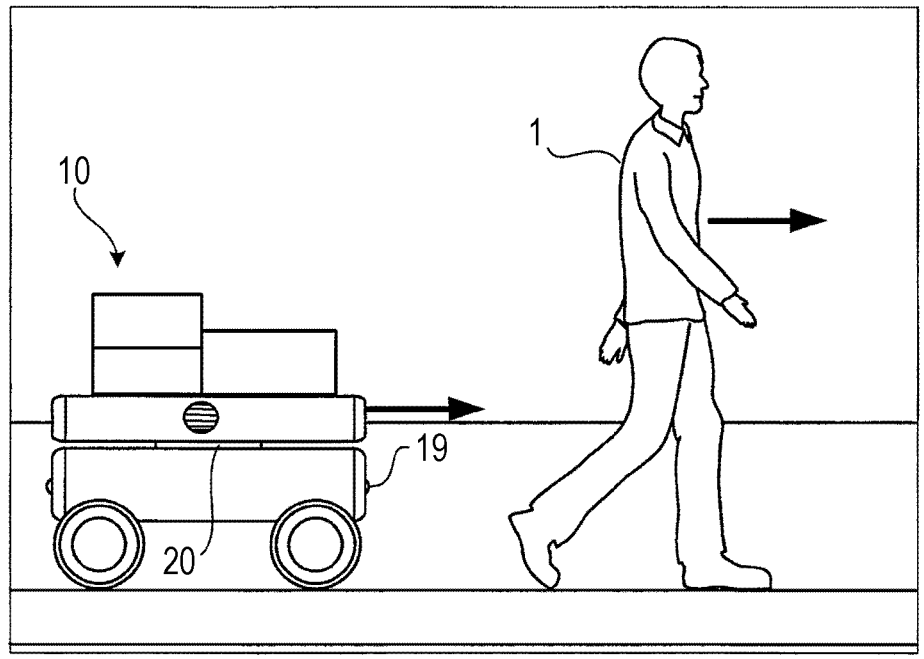
FIGS. 5A and 5B illustrate a state in which the autonomous moving apparatus is moving behind a follow target in a follow mode.
Figure 5B:
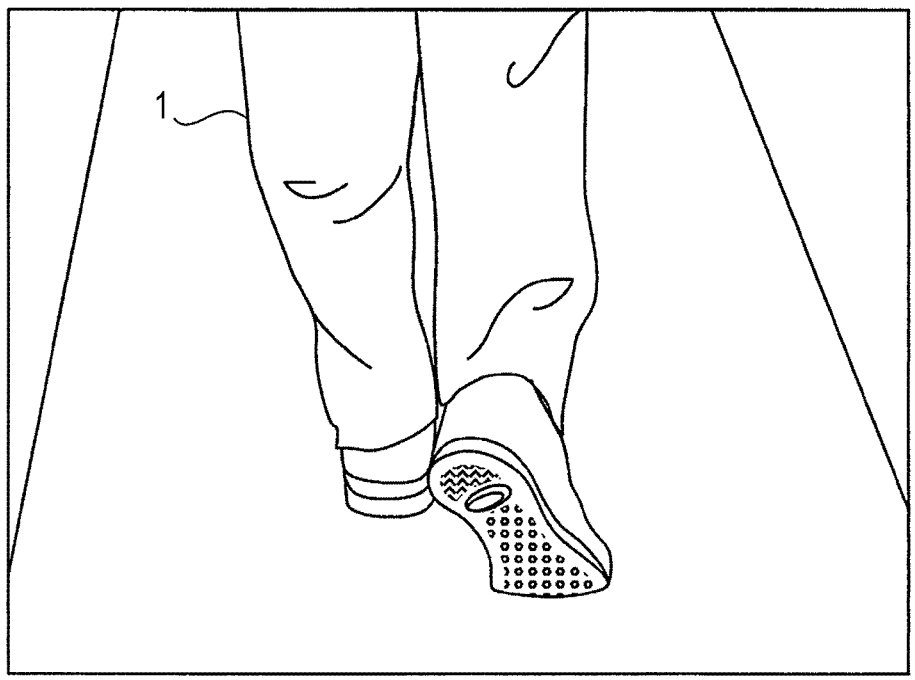

For example, if the autonomous moving apparatus 10 is moving behind the follow target 1 in the follow mode as illustrated in FIG. 5A, the detecting part 41 detects a distance from and the shape of the feet of the follow target 1 as illustrated in FIG. 5B.

Figure 6:
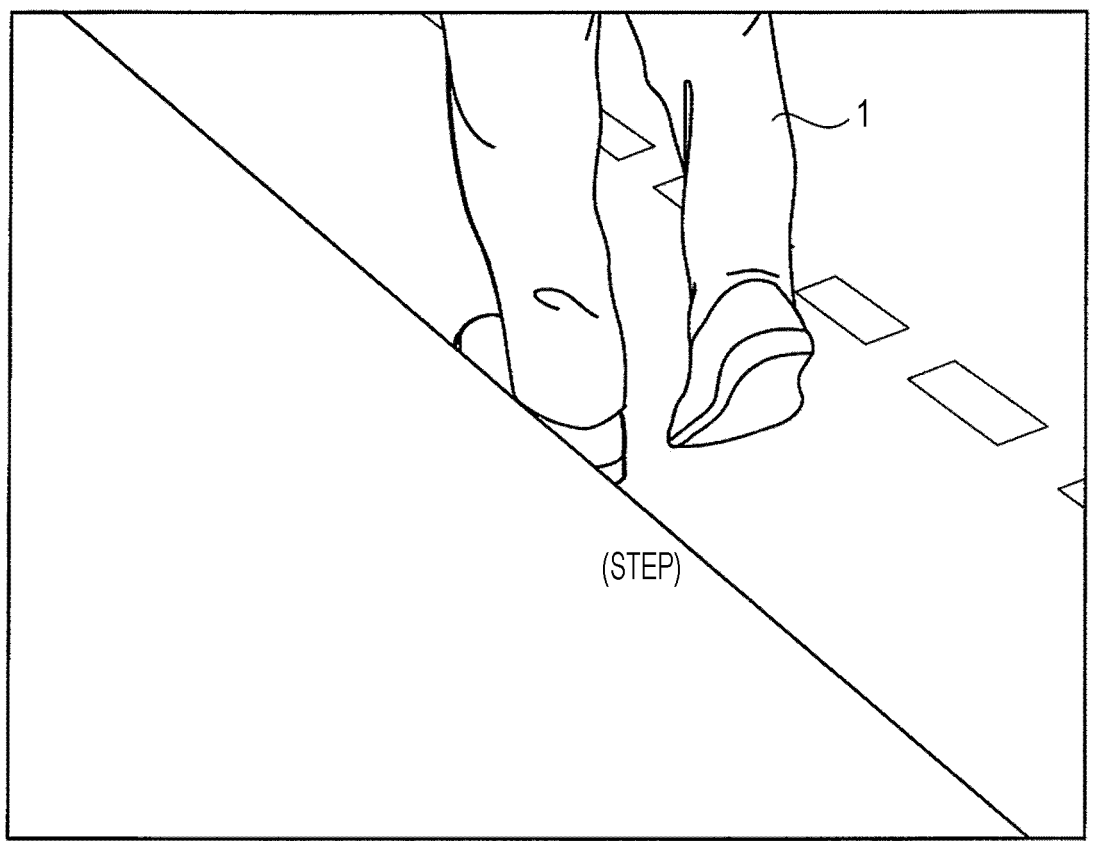
FIG. 6 illustrates a state in which the presence or absence and the height of an obstacle such as a step on a sidewalk between the autonomous moving apparatus and the follow target are detected.

If an obstacle such as a step on a sidewalk is present between the autonomous moving apparatus 10 and the follow target 1, the detecting part 41 may detect the presence or absence and the height of the step as illustrated in FIG. 6.

The moving part 50 is a moving unit that moves the autonomous moving apparatus. Based on control of the control part 48, the moving part 50 causes the autonomous moving apparatus to move so as to follow movement of the follow target 1 that is detected by the detecting part 32.

The data storing part 44 stores various types of data for controlling movement of the autonomous moving apparatus based on control of the control part 48.

When a route of the autonomous moving apparatus is adjusted to a route of the follow target under control of the moving part 50, the control part 48 controls the moving part 50 so that the autonomous moving apparatus continues to move without changing the route of the autonomous moving apparatus if the follow target has changed the route but an obstacle having a possibility of causing a movement abnormality when the autonomous moving apparatus moves over the obstacle is present between the route of the follow target and the route of the autonomous moving apparatus. When the obstacle is no longer present between the route of the follow target and the route of the autonomous moving apparatus, the control part 48 controls the moving part 50 so that the route of the autonomous moving apparatus is adjusted to the route of the follow target.

The obstacle having the possibility of causing the movement abnormality when the autonomous moving apparatus moves over the obstacle is an obstacle having a height or width equal to or larger than a preset height or width. That is, the control part 48 controls the moving part 50 so as to determine whether to adjust the route of the autonomous moving apparatus to the route of the follow target depending on whether the height or width of the obstacle is equal to or larger than the preset height or width.

For example, the obstacle having a height equal to or larger than the preset height is a step of 10 cm or larger. For example, the obstacle having a width equal to or larger than the preset width is a recess or hole having a width of 20 cm or larger. Thus, the obstacle has a possibility of causing such a movement abnormality that the autonomous moving apparatus 10 falls down or becomes unable to move when the autonomous moving apparatus 10 moves over the obstacle. The value of the height or width for use in the determination on the obstacle is determined based on values such as the diameter of the wheel of the moving mechanism 18 and the minimum ground clearance of the autonomous moving apparatus 10.

When the height or width of the obstacle is equal to or larger than the preset height or width, the control part 48 controls the moving part 50 so that the route of the autonomous moving apparatus is not adjusted to the route of the follow target.

This exemplary embodiment is described using a step having a height equal to or larger than the preset height (hereinafter referred to simply as a step) as an example of the obstacle having the possibility of causing the movement abnormality when the autonomous moving apparatus moves over the obstacle. The exemplary embodiment of the present disclosure is not limited to this case but may similarly be applied to a case in which the obstacle is a groove having a width equal to or larger than the preset width, a hole having a diameter equal to or larger than a preset diameter, or a protrusion having a height equal to or larger than the preset height.

The imaging part 42 captures an image of the periphery of the autonomous moving apparatus. The image processing part 45 acquires a condition of the follow target by processing the image captured by the imaging part 42.

When the condition of the follow target that is acquired by the image processing part 45 is a predetermined specific condition, the control part 48 controls the moving part 50 so that the route of the autonomous moving apparatus is not adjusted to the route of the follow target even if the step is no longer present between the route of the follow target and the route of the autonomous moving apparatus.

That is, when the condition of the follow target is the predetermined specific condition before the start of adjustment of the route of the autonomous moving apparatus to the route of the follow target, the control part 48 controls the moving part 50 so that the current route is maintained without changing the route.

When the condition of the follow target is the predetermined specific condition after the start of adjustment of the route of the autonomous moving apparatus to the route of the follow target, the control part 48 may control the moving part 50 so that the route changing is halted and the unchanged route is maintained.

When the condition of the follow target is the predetermined specific condition in a preset period before the follow target changes the route, for example, for five seconds before the follow target changes the route, the control part 48 may control the moving part 50 so that the route of the autonomous moving apparatus is not adjusted to the route of the follow target even if the follow target has changed the route.

When the condition of the follow target becomes the predetermined specific condition in a preset period after the follow target has changed the route, for example, in five seconds after the follow target has changed the route, the control part 48 may control the moving part 50 so that, if the route of the autonomous moving apparatus has not been changed, the current route is maintained without changing the route and so that, if the route of the autonomous moving apparatus has already been changed, the changed route is maintained.

In this exemplary embodiment, the predetermined condition of the follow target is, for example, a condition in which the follow target performs a specific action with the hand. For example, the condition in which the follow target performs a specific action with the hand is a condition in which the follow target raises the right hand. For example, the predetermined condition of the follow target is also a condition in which the follow target wears a cap backward on the head.

When the follow target has changed the route while walking ahead of the autonomous moving apparatus 10, the follow target will return to the original route soon. Therefore, if the follow target does not want the autonomous moving apparatus 10 to change the route, the follow target performs the specific action or comes into the specific condition. Thus, it is possible to prevent the route changing of the autonomous moving apparatus 10.

The illuminance detecting part 46 detects an illuminance around the autonomous moving apparatus. The sound detecting part 47 detects a noise level around the autonomous moving apparatus.

When the autonomous moving apparatus is moving beside the follow target 1 without adjusting the route of the autonomous moving apparatus to the route of the follow target 1, the sound/light generating part 43 generates sound or light indicating that the autonomous moving apparatus is moving beside the follow target 1.

Specifically, the sound/light generating part 43 generates sound indicating that the autonomous moving apparatus is moving beside the follow target 1 at a sound level determined based on a noise level detected by the sound detecting part 47. The sound/light generating part 43 generates light indicating that the autonomous moving apparatus is moving beside the follow target 1 with brightness determined based on an illuminance detected by the illuminance detecting part 46.

Through the control described above, the autonomous moving apparatus 10 may avoid changing the route if the follow target has changed the route over the obstacle such as the step. Then, the autonomous moving apparatus 10 may move beside the follow target. Therefore, it is necessary that the sound/light generating part 43 generate sound or light to prompt the follow target to recognize that the autonomous moving apparatus is moving beside the follow target. If the ambient noise level is high, however, the sound may fail to reach the follow target even though the sound is output at a predetermined output level. If the ambient illuminance is high, the follow target may be unaware of the light even though the light is generated with predetermined brightness.

When the noise level detected by the sound detecting part 47 is higher than a preset value, the sound/light generating part 43 generates sound indicating that the autonomous moving apparatus is moving beside the follow target at a sound level higher than the noise level, for example, a sound level that is 1.1 times as high as the detected noise level. When the illuminance detected by the illuminance detecting part 46 is higher than a preset value, the sound/light generating part 43 generates light indicating that the autonomous moving apparatus is moving beside the follow target with brightness achieving an illuminance higher than the detected illuminance.

In a dark environment such as a tunnel having an ambient illuminance lower than the preset value, the follow target may fail to recognize the autonomous moving apparatus 10. Therefore, the sound/light generating part 43 may avoid notifying the follow target that the autonomous moving apparatus is moving beside the follow target when the illuminance detected by the illuminance detecting part 46 is equal to or higher than the preset value but may notify the follow target that the autonomous moving apparatus is moving beside the follow target when the detected illuminance is lower than the preset value.

When a distance from the follow target is equal to or longer than a preset followable distance, the control part 48 performs control so that the autonomous moving apparatus stops moving behind the follow target. For example, when the distance from the follow target is equal to or longer than 1 m, the control part 48 determines that it is difficult to follow the follow target and performs control so that the autonomous moving apparatus stops its movement.

When the autonomous moving apparatus 10 moves beside the follow target, however, the distance between the autonomous moving apparatus 10 and the follow target is longer than that in the normal state. When the followable distance in the normal state is used as it is for the case in which the autonomous moving apparatus 10 moves beside the follow target, the autonomous moving apparatus 10 may stop even though the autonomous moving apparatus 10 may continue to follow the follow target.

When the distance from the follow target is equal to or longer than the preset followable distance and the control part 48 performs control so that the autonomous moving apparatus stops moving behind the follow target, the control part 48 sets the followable distance to become longer in the case in which the autonomous moving apparatus moves beside the follow target without adjusting the route of the autonomous moving apparatus to the route of the follow target than in the case in which the route of the autonomous moving apparatus is identical to the route of the follow target.

Specifically, the control part 48 calculates the followable distance in the case in which the autonomous moving apparatus moves beside the follow target based on the width of the sidewalk where the autonomous moving apparatus is moving. For example, the control part 48 calculates a distance that is three times as large as the width of the sidewalk where the autonomous moving apparatus is moving as the followable distance in the case in which the autonomous moving apparatus moves beside the follow target.

The control part 48 may calculate a value obtained by multiplying the followable distance in the normal state by a preset value as the followable distance in the case in which the autonomous moving apparatus moves beside the follow target. For example, the control part 48 may calculate 3 m as the followable distance in the case in which the autonomous moving apparatus moves beside the follow target by tripling 1 m that is the followable distance in the normal state.

Next, the operation of the autonomous moving apparatus 10 of this exemplary embodiment is described in detail.

First, the operation of the autonomous moving apparatus 10 of this exemplary embodiment is described with reference to a flowchart of FIG. 7.

When a user who intends to transport a package by using the autonomous moving apparatus 10 depresses the follow mode button provided on the autonomous moving apparatus 10, the user detected by the detecting part 41 is recognized as a follow target (Step S101).

The control part 48 controls the moving part 50 and therefore the autonomous moving apparatus 10 starts an operation of following the recognized follow target in the follow mode (Step S102).

If the follow target does not change the route ("no" in Step S103), the autonomous moving apparatus 10 continues to move behind the follow target in the follow mode (Step S102).

If the follow target has changed the route ("yes" in Step S103), the control part 48 determines whether a step having a height equal to or larger than a predetermined height is present between the follow target and the autonomous moving apparatus based on information on a surrounding shape or the like that is detected by the detecting part 41 (Step S104).

If the step is not present ("no" in Step S104), the control part 48 changes the route of the autonomous moving apparatus so that the route becomes identical to the route of the follow target (Step S106). Then, the control part 48 continues to control the moving part 50 so that the autonomous moving apparatus continues to follow the follow target (Step S102).

If the step is present between the follow target and the autonomous moving apparatus ("yes" in Step S104), the control part 48 maintains the current route without changing the route of the autonomous moving apparatus. As a result, the autonomous moving apparatus 10 moves beside the follow target (Step S105).

If the step is no longer present between the follow target and the autonomous moving apparatus while the autonomous moving apparatus continues to move beside the follow target ("no" in Step S104), the control part 48 changes the route of the autonomous moving apparatus so that the route becomes identical to the route of the follow target (Step S106). Then, the control part 48 continues to control the moving part 50 so that the autonomous moving apparatus continues to follow the follow target (Step S102).

Next, an example of an operation to be performed when the follow target 1 moves down to a roadway over the step while the autonomous moving apparatus 10 is moving behind the follow target 1 walking along the sidewalk in the follow mode is described with reference to FIG. 8 to FIG. 13.

Figure 8:
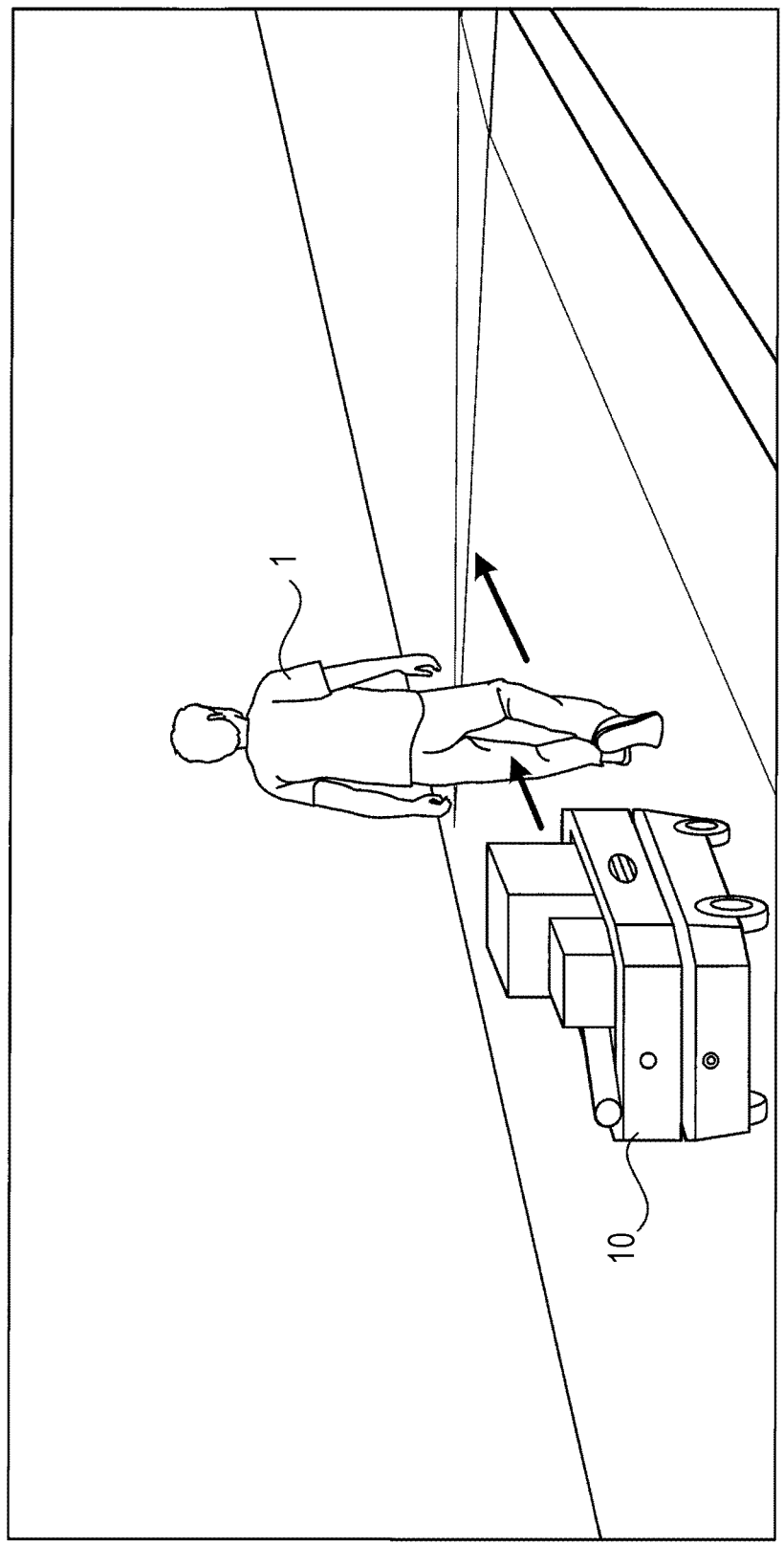
FIG. 8 illustrates an example of an operation to be performed when the follow target moves down to a roadway over the step while the autonomous moving apparatus is moving behind the follow target walking along the sidewalk in the follow mode.

FIG. 8 illustrates a state in which the autonomous moving apparatus 10 is moving behind the follow target 1 walking along the sidewalk. In FIG. 8, both the autonomous moving apparatus 10 and the follow target 1 are moving along the sidewalk.

Figure 9:
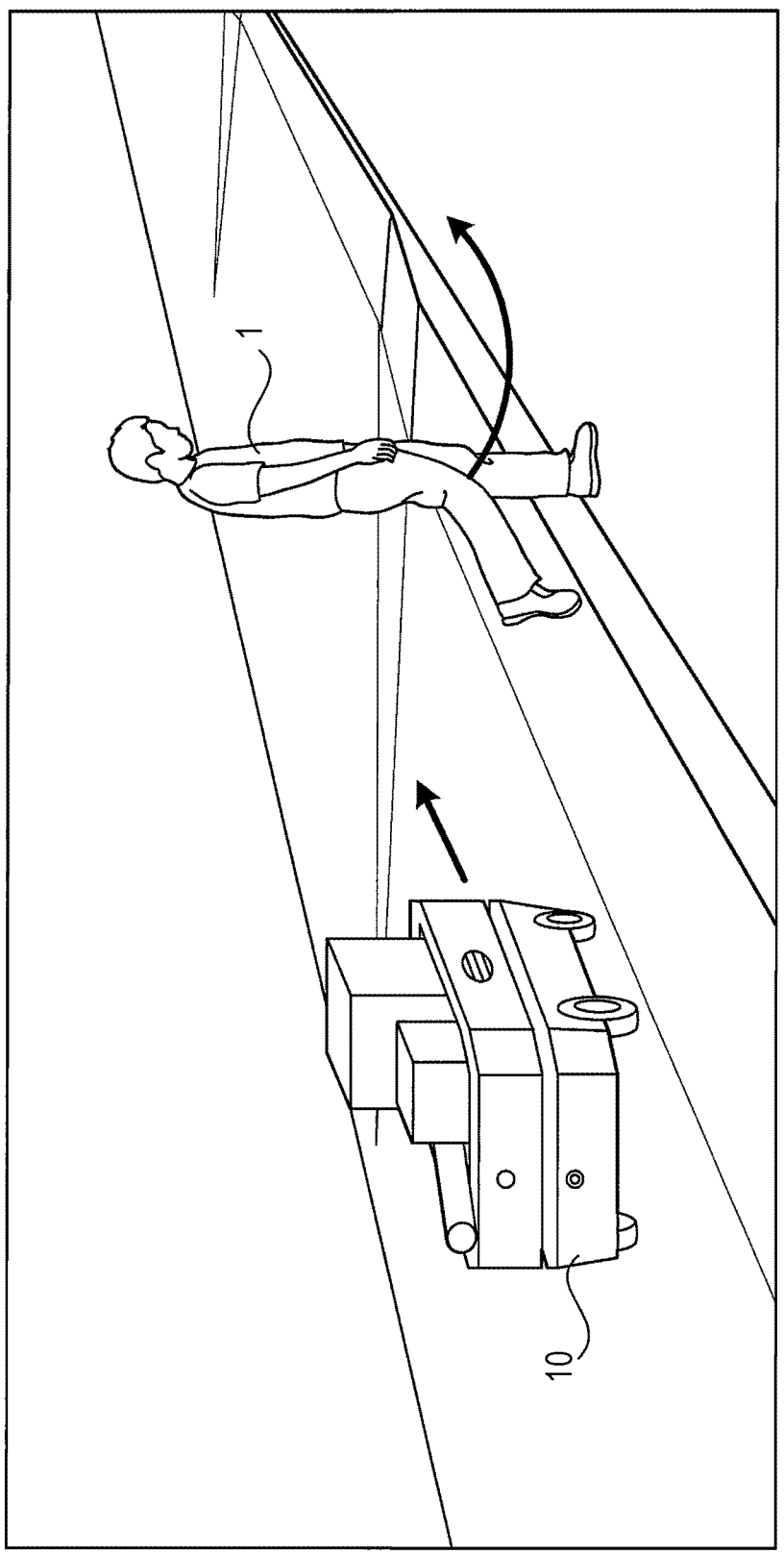
FIG. 9 illustrates the example of the operation to be performed when the follow target moves down to the roadway over the step while the autonomous moving apparatus is moving behind the follow target walking along the sidewalk in the follow mode.

FIG. 9 illustrates a state in which the follow target 1 moves down to the roadway in the state of FIG. 8. FIG. 9 illustrates a case in which the follow target 1 has changed the route by moving from the sidewalk to the roadway over the step between the sidewalk and the roadway.

Figure 10:
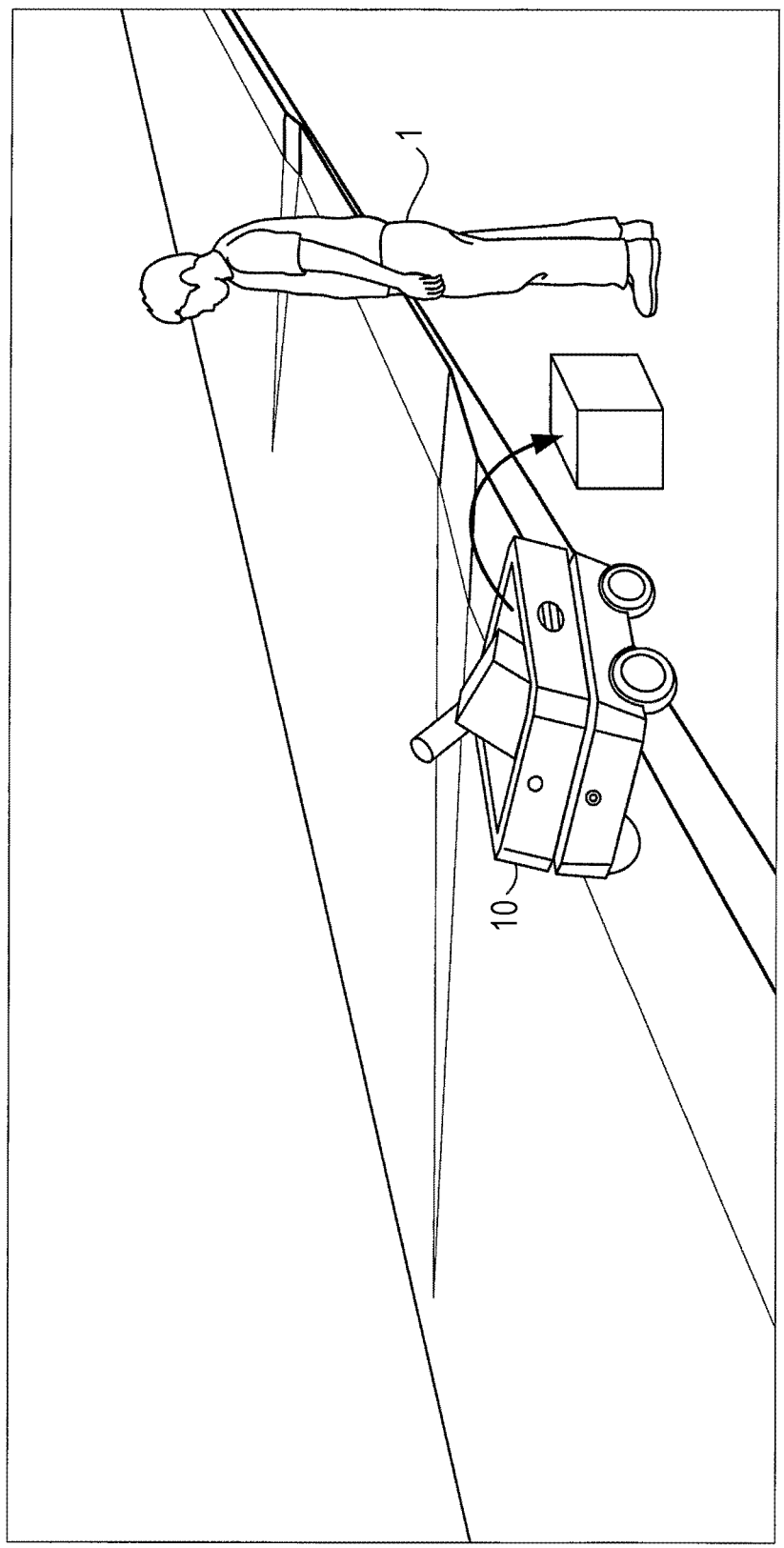
FIG. 10 illustrates a state in which the autonomous moving apparatus has moved over the step on the sidewalk to follow the follow target.

If the autonomous moving apparatus 10 has moved over the step on the sidewalk to follow the follow target 1, as illustrated in FIG. 10, there is a possibility of causing such a movement abnormality that a loaded package falls, the autonomous moving apparatus 10 falls down, or the autonomous moving apparatus 10 becomes unable to move due to contact between the bottom of the autonomous moving apparatus 10 and the step.

In the autonomous moving apparatus 10 of this exemplary embodiment, if the detecting part 41 detects that a step having a height equal to or larger than a preset height, for example, 10 cm is present between the autonomous moving apparatus 10 and the follow target 1, control is performed so as not to change the route to a route in which the autonomous moving apparatus 10 follows the follow target 1 over the step.

Figure 11:
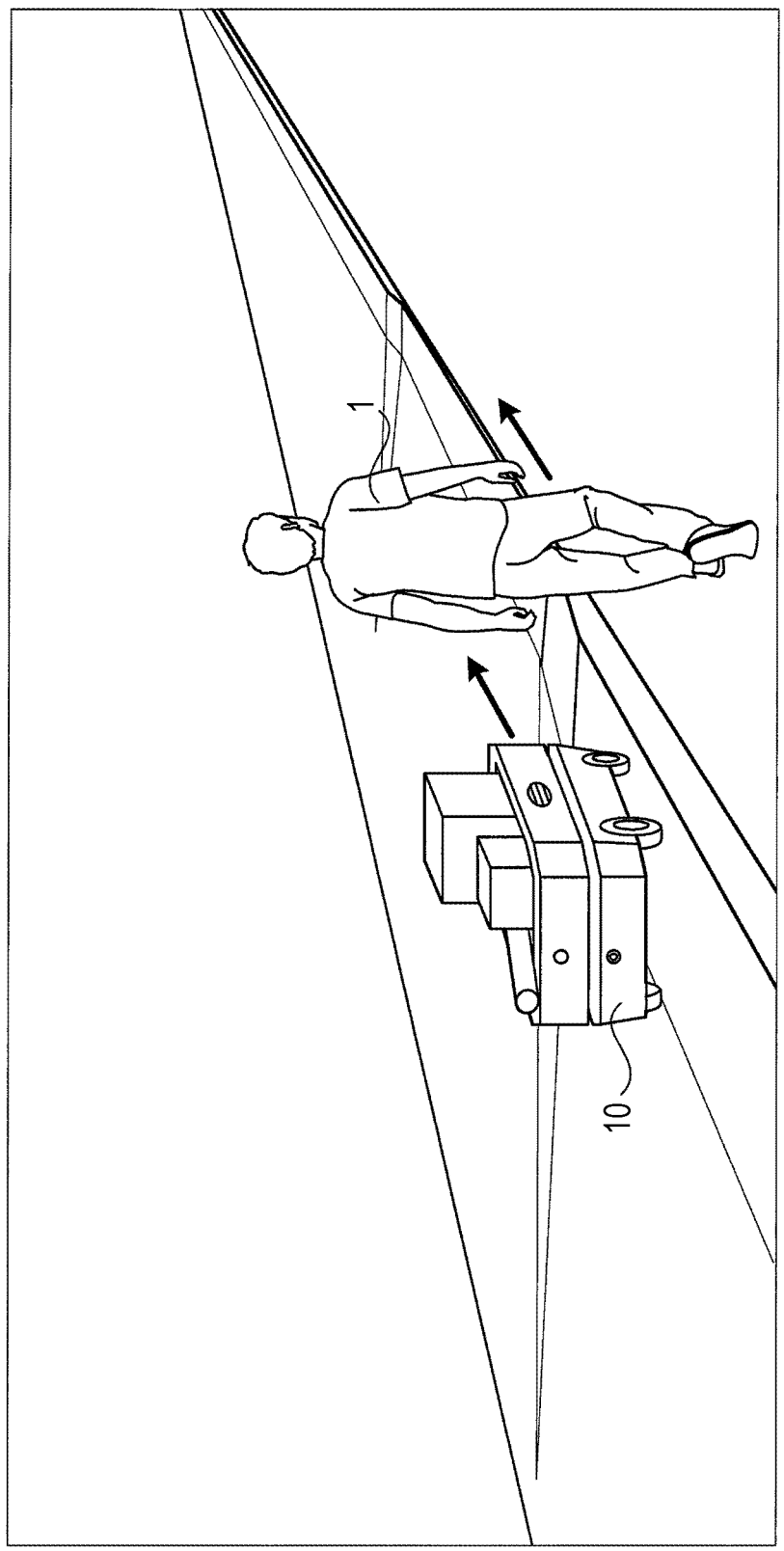
FIG. 11 illustrates the example of the operation to be performed when the follow target moves down to the roadway over the step while the autonomous moving apparatus is moving behind the follow target walking along the sidewalk in the follow mode.

As a result, the autonomous moving apparatus 10 moves along the sidewalk while maintaining the original route as illustrated in FIG. 11. Thus, the autonomous moving apparatus 10 moves beside the follow target 1.

Figure 12:
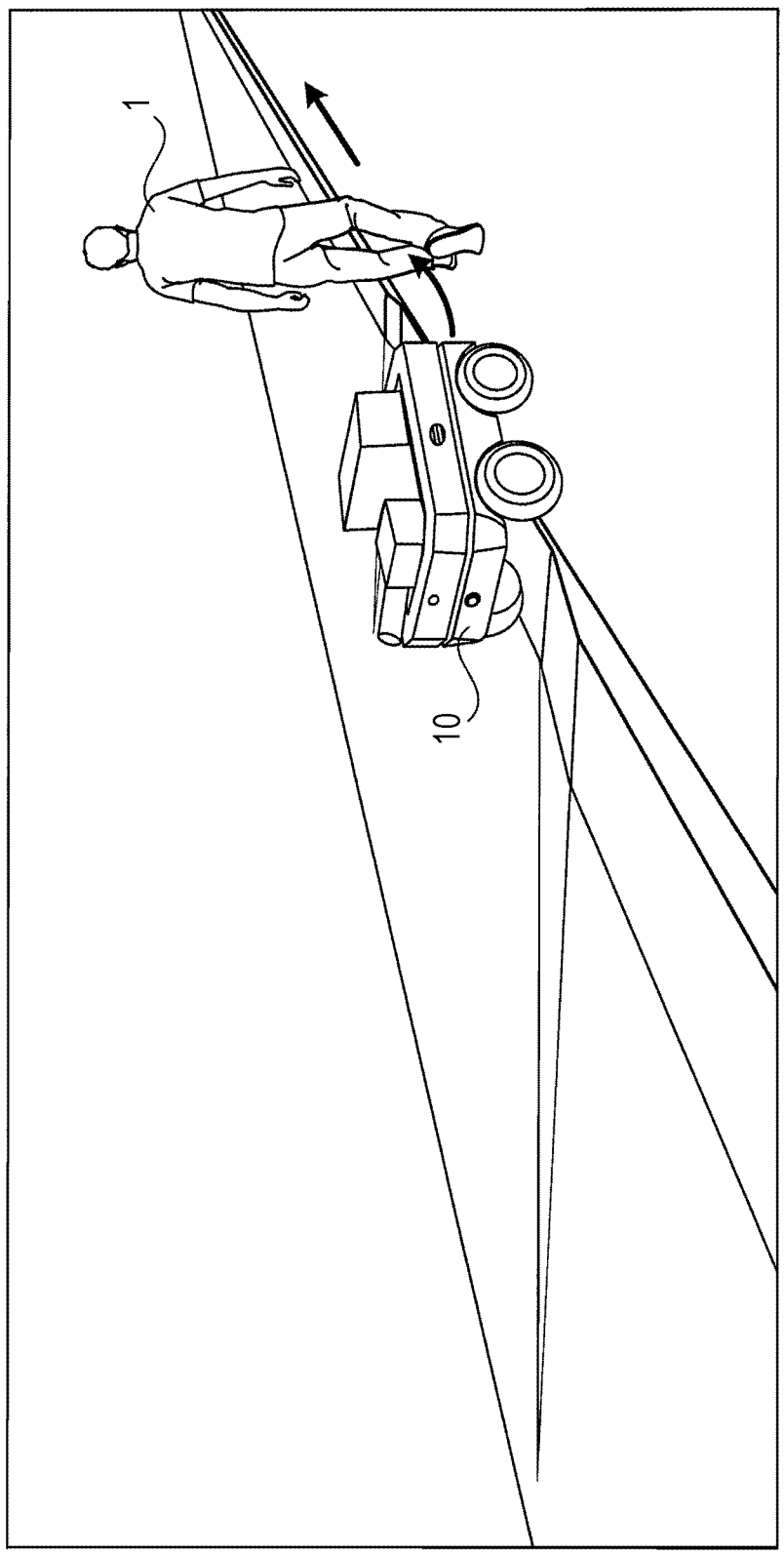
FIG. 12 illustrates the example of the operation to be performed when the follow target moves down to the roadway over the step while the autonomous moving apparatus is moving behind the follow target walking along the sidewalk in the follow mode.

When the autonomous moving apparatus 10 and the follow target 1 reach a place where no step is present or a step having a height smaller than the preset height is present between the sidewalk and the roadway as illustrated in FIG. 12, the autonomous moving apparatus 10 changes the route to move behind the follow target 1.

Figure 13:
FIG. 13 illustrates the example of the operation to be performed when the follow target moves down to the roadway over the step while the autonomous moving apparatus is moving behind the follow target walking along the sidewalk in the follow mode.

Then, the autonomous moving apparatus 10 continues the operation of following the follow target 1 in the follow mode as illustrated in FIG. 13.

The example described with reference to FIG. 8 to FIG. 13 shows a case in which the follow target 1 moves down from the sidewalk to the other side across the roadway or moves down to the roadway for route confirmation. For example, there is a case in which the follow target 1 temporarily moves down from the sidewalk to the roadway and then returns to the original sidewalk because the sidewalk is congested. If the autonomous moving apparatus 1 moves down to the roadway to follow the follow target 1, the autonomous moving apparatus 1 needs to change the route again to return to the sidewalk when the follow target 1 returns to the sidewalk. Thus, unnecessary route changing is repeated.

In the autonomous moving apparatus 10 of this exemplary embodiment, when the follow target 1 is in the specific condition, control is performed so as not to change the route of the autonomous moving apparatus even if the follow target has changed the route and the step is not present between the autonomous moving apparatus and the follow target 1.

An operation of the autonomous moving apparatus 10 in this control is described with reference to a flowchart of FIG. 14.

Figure 7:
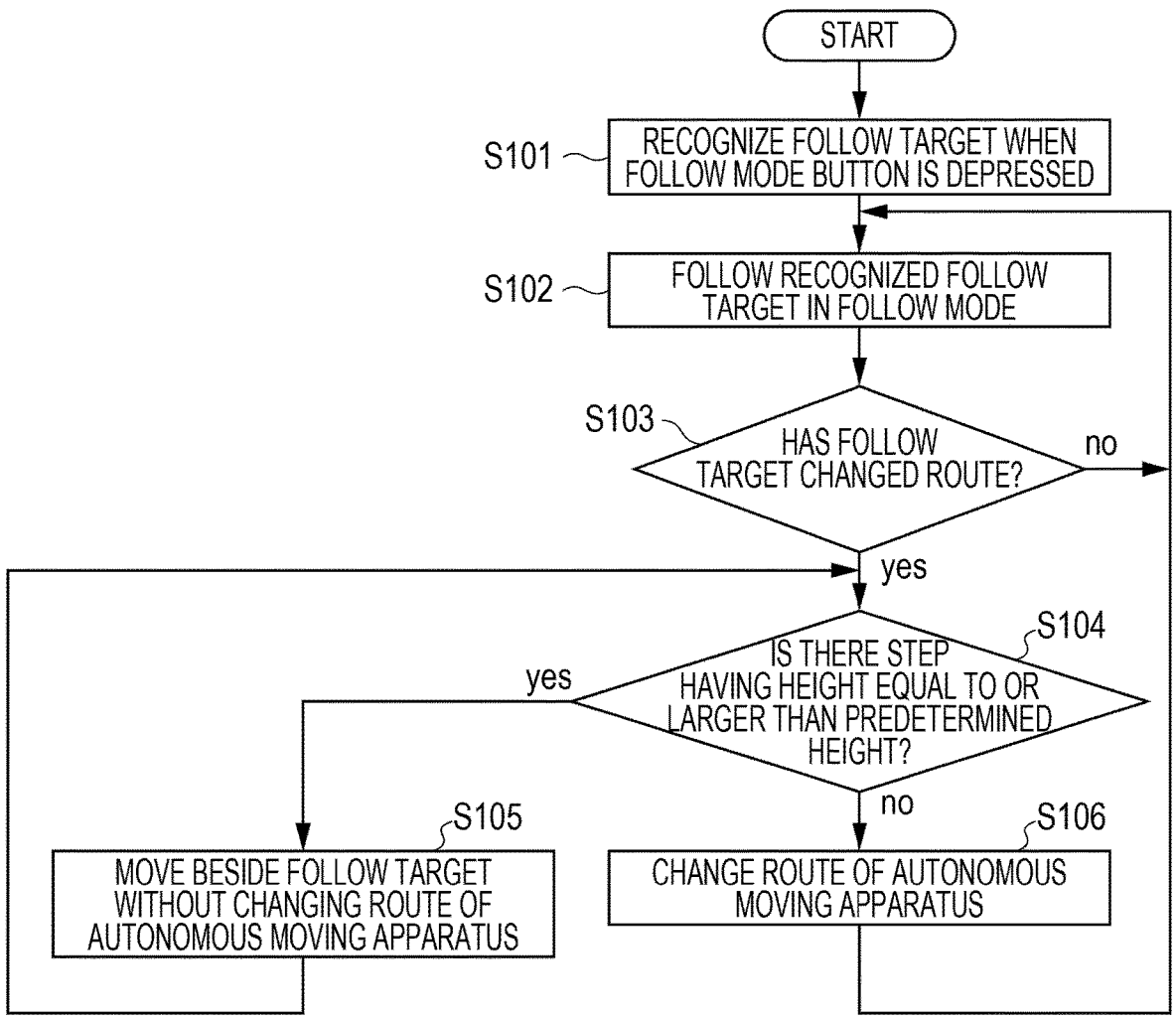
FIG. 7 is a flowchart for illustrating an operation of the autonomous moving apparatus of the exemplary embodiment of the present disclosure.
Figure 14:
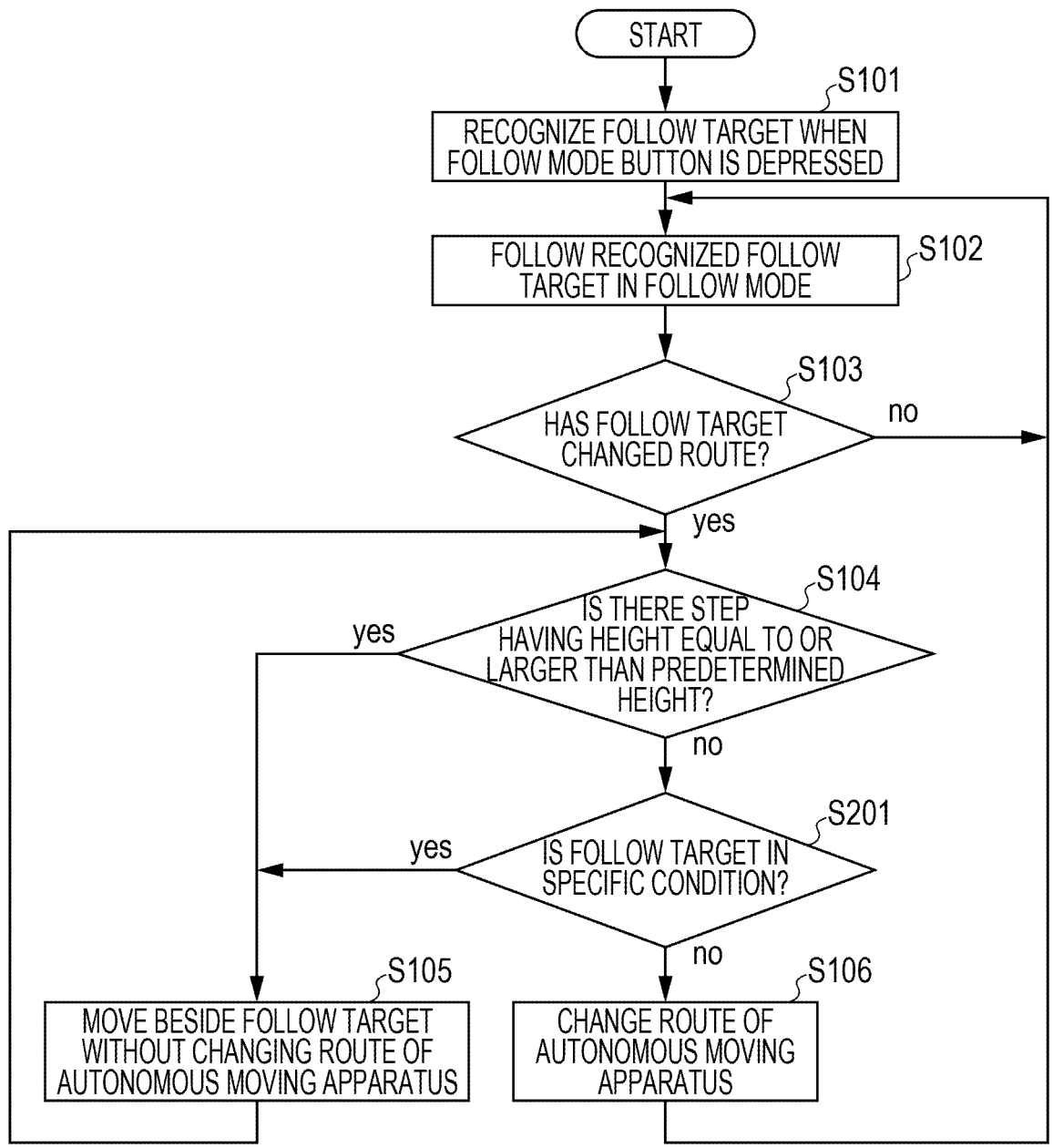
FIG. 14 is a flowchart for illustrating an operation of the autonomous moving apparatus to be performed when the follow target has changed a route while performing a specific action or coming into a specific condition.

In the flowchart illustrated in FIG. 14, processing of Step S201 is only added to the flowchart illustrated in FIG. 7. Therefore, the added processing is only described.

If the follow target has changed the route ("yes" in Step S103), the control part 48 determines whether a step having a height equal to or larger than the predetermined height is present between the follow target and the autonomous moving apparatus based on information on a surrounding shape or the like that is detected by the detecting part 41 (Step S104).

If the step is not present ("no" in Step S104) and if the follow target is not in the specific condition ("no" in Step S201), the control part 48 changes the route of the autonomous moving apparatus so that the route becomes identical to the route of the follow target (Step S106).

If the follow target is in the specific condition ("yes" in Step S201), the control part 48 maintains the current route without changing the route of the autonomous moving apparatus. As a result, the autonomous moving apparatus 10 moves beside the follow target (Step S105).

Next, an example of an operation to be performed when the follow target 1 in the specific condition moves down to the roadway over the step while the autonomous moving apparatus 10 is moving behind the follow target 1 walking along the sidewalk in the follow mode is described with reference to FIG. 15 to FIG. 18.

The following description is made taking an exemplary case in which the specific condition of the follow target 1 is a condition in which the follow target 1 raises the right hand or wears a cap backward.

Figure 15:
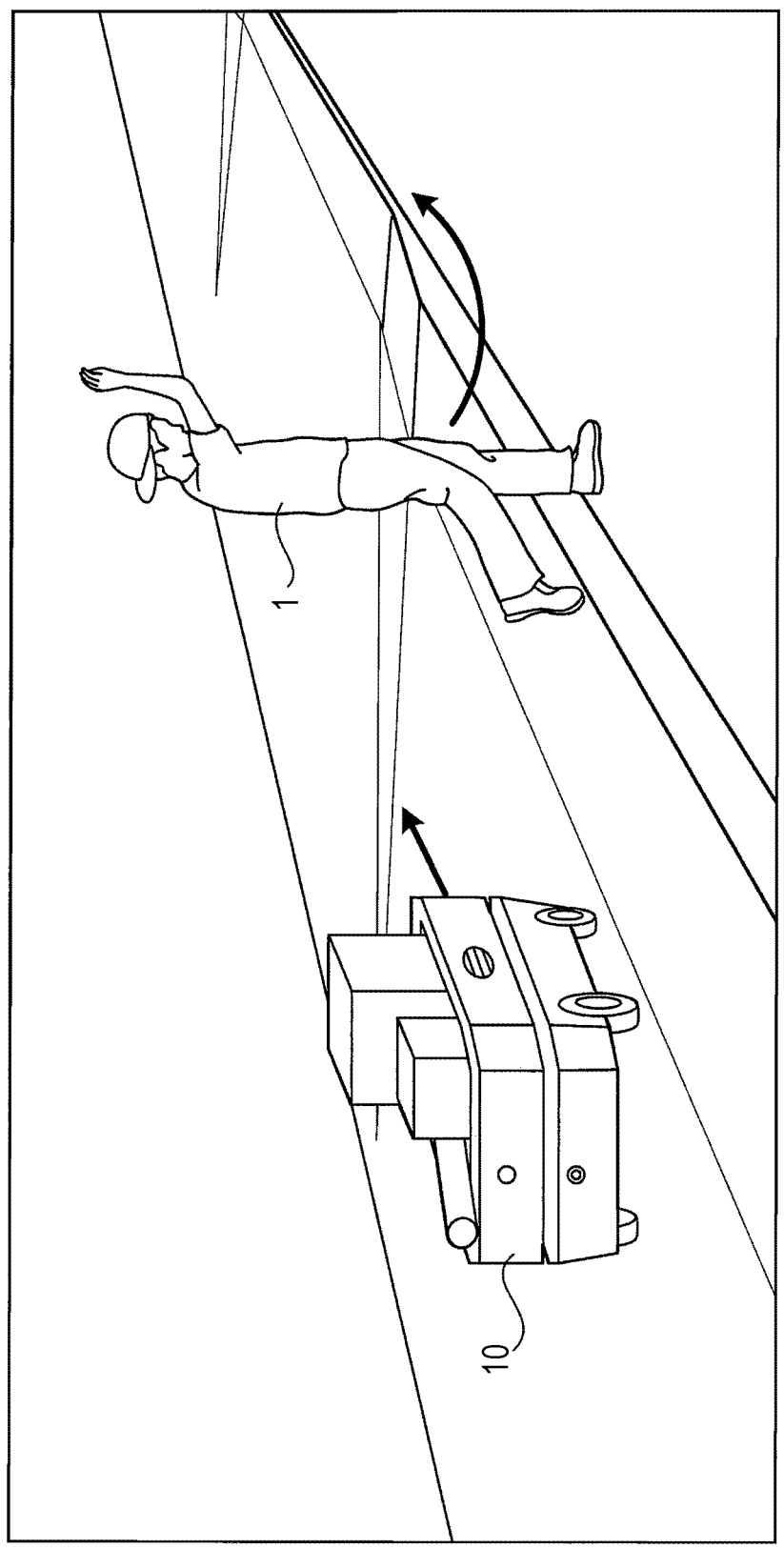
FIG. 15 illustrates an example of an operation to be performed when the follow target in the specific condition moves down to the roadway over the step while the autonomous moving apparatus is moving behind the follow target walking along the sidewalk in the follow mode.

FIG. 15 illustrates a state in which the follow target 1 walking along the sidewalk moves down to the roadway while raising the right hand or wearing the cap backward. FIG. 15 illustrates a case in which the follow target 1 in the specific condition has changed the route by moving from the sidewalk to the roadway over the step between the sidewalk and the roadway.

Figure 16:
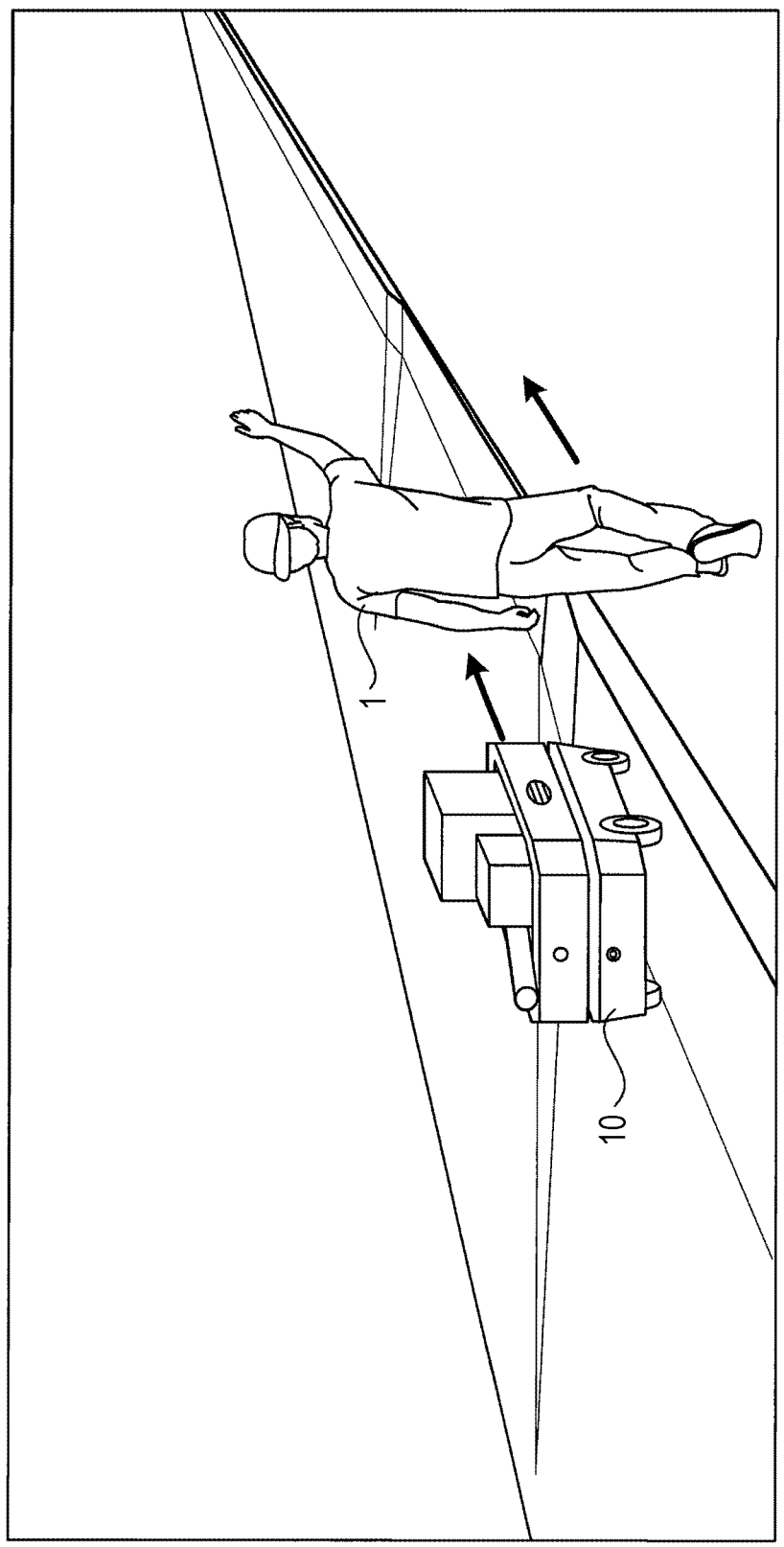
FIG. 16 illustrates the example of the operation to be performed when the follow target in the specific condition moves down to the roadway over the step while the autonomous moving apparatus is moving behind the follow target walking along the sidewalk in the follow mode.

In the autonomous moving apparatus 10 of this exemplary embodiment, the detecting part 41 detects that a step having the preset height is present between the autonomous moving apparatus 10 and the follow target 1. Therefore, control is performed so as not to change the route to a route in which the autonomous moving apparatus 10 follows the follow target 1 over the step. As illustrated in FIG. 16, the autonomous moving apparatus 10 moves beside the follow target 1.

Figure 17:
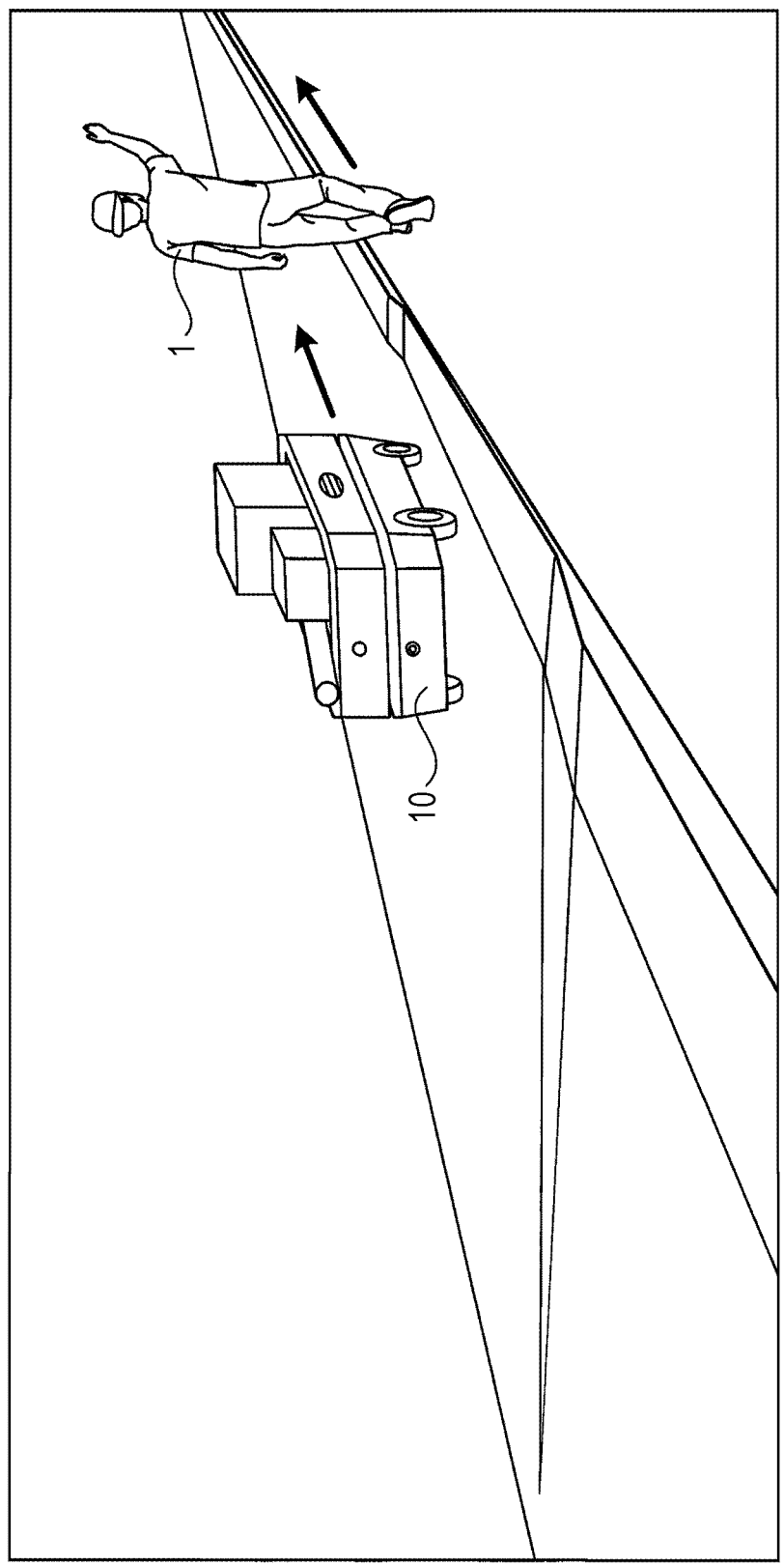
FIG. 17 illustrates the example of the operation to be performed when the follow target in the specific condition moves down to the roadway over the step while the autonomous moving apparatus is moving behind the follow target walking along the sidewalk in the follow mode.

When the autonomous moving apparatus 10 and the follow target 1 reach a place where no step is present or a step having a height smaller than the preset height is present between the sidewalk and the roadway as illustrated in FIG. 17 but it is determined that the follow target 1 raises the right hand or wears the cap backward based on an image captured by the imaging part 42, control is performed so that the autonomous moving apparatus 10 continues to move while maintaining the current route without changing the route of the autonomous moving apparatus. As a result, the autonomous moving apparatus 10 still moves beside the follow target 1.

Figure 18:
FIG. 18 illustrates the example of the operation to be performed when the follow target in the specific condition moves down to the roadway over the step while the autonomous moving apparatus is moving behind the follow target walking along the sidewalk in the follow mode.

When the follow target 1 returns to the original sidewalk as illustrated in FIG. 18, the autonomous moving apparatus 10 continues the operation of following the follow target 1 in the follow mode.

Next, an operation to be performed when the autonomous moving apparatus 10 notifies the follow target 1 that the autonomous moving apparatus 10 is moving beside the follow target 1 is described with reference to FIG. 19.

Figure 19:
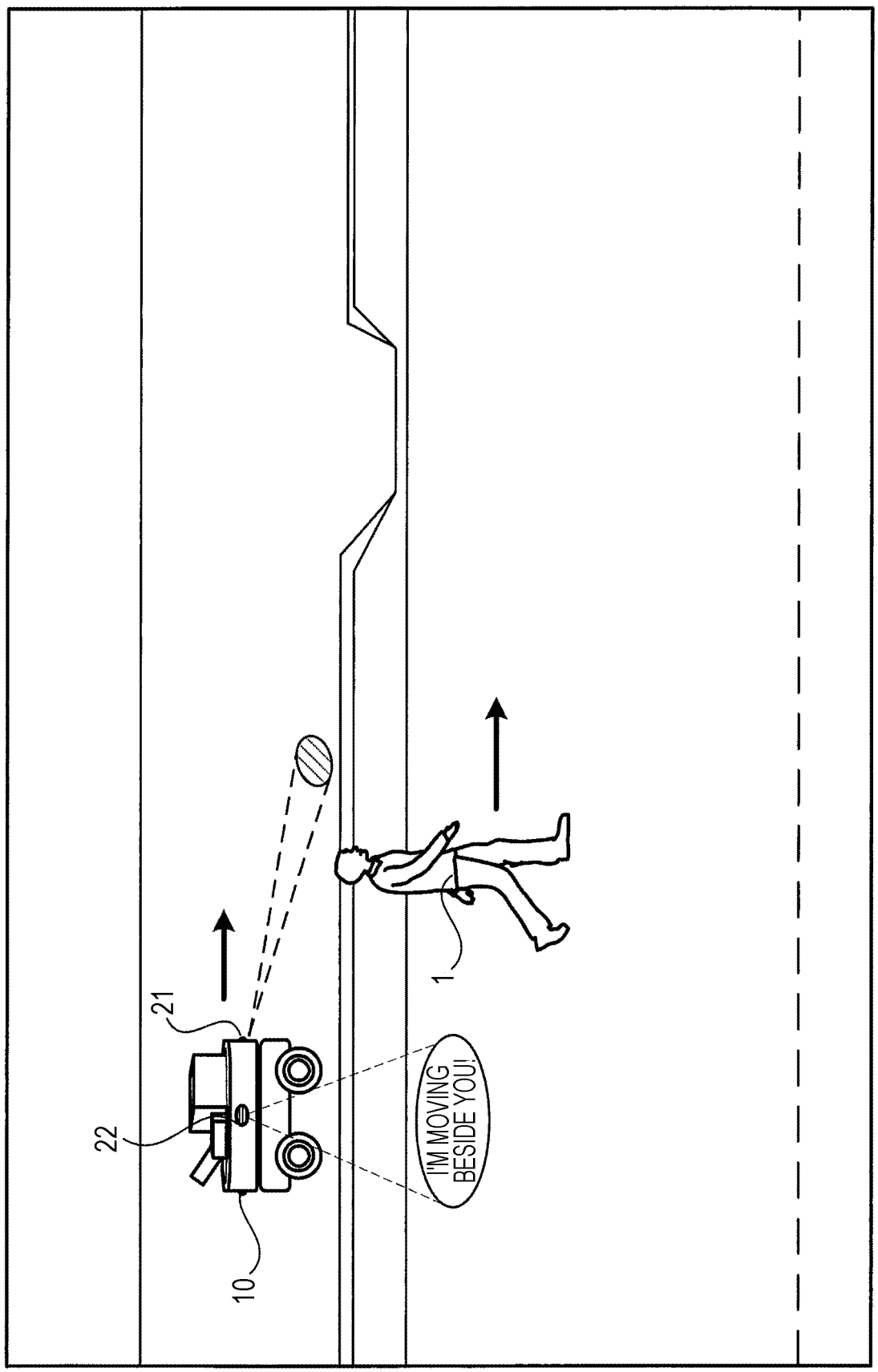
FIG. 19 illustrates an operation to be performed when the autonomous moving apparatus notifies the follow target that the autonomous moving apparatus is moving beside the follow target.

In the autonomous moving apparatus 10 of this exemplary embodiment, when the autonomous moving apparatus is moving beside the follow target 1 as illustrated in FIG. 19, the sound/light generating part 43 generates sound or light indicating that the autonomous moving apparatus is moving beside the follow target 1.

Specifically, the sound/light generating part 43 causes the loudspeaker 22 to output a voice "I'M MOVING BESIDE YOU!" or turns ON the LED indicator 21 to output light, thereby notifying the follow target 1 that the autonomous moving apparatus is moving beside the follow target 1.

Figure 20:
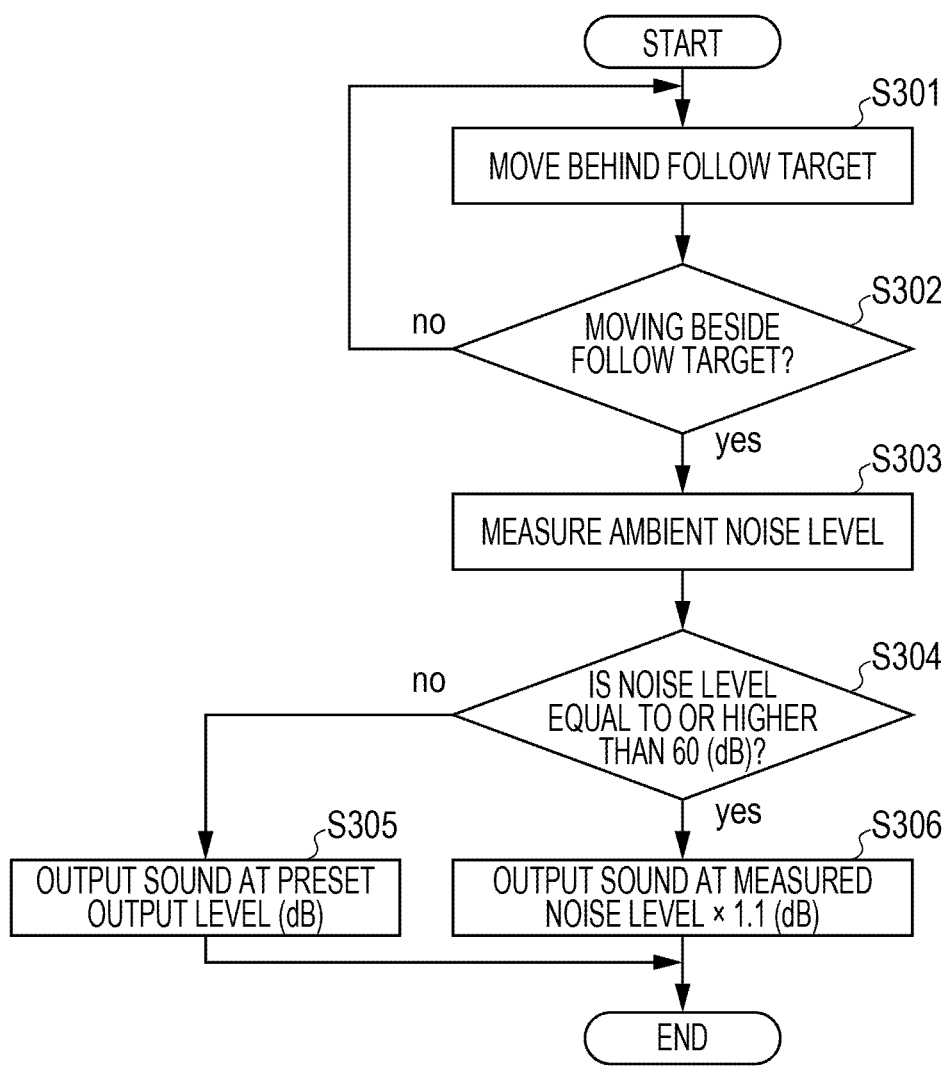
FIG. 20 is a flowchart for illustrating an example of sound output control to be performed by a sound/light generating part.

If the ambient noise level is high, however, the sound output from the loudspeaker 22 may fail to reach the follow target 1 even though the sound is output at a predetermined sound level. Therefore, the sound/light generating part 43 controls the sound output as illustrated in FIG. 20 to change the sound output depending on the ambient noise level.

An example of the sound output control is described with reference to a flowchart of FIG. 20.

If the autonomous moving apparatus 10 moves behind the follow target 1 (Step S301) but then moves beside the follow target 1 under the condition described above ("yes" in Step S302), the sound detecting part 47 measures an ambient noise level (Step S303).

If the measured noise level is lower than a preset value, for example, 60 (dB) ("no" in Step S304), the sound/light generating part 43 outputs sound at a preset output level, for example, 60 (dB) (Step S305).

If the measured noise level is equal to or higher than the preset value, for example, 60 (dB) ("yes" in Step S304), the sound/light generating part 43 outputs sound at an output level (dB) obtained by multiplying the value of the measured noise level by 1.1 (Step S306).

Figure 21:
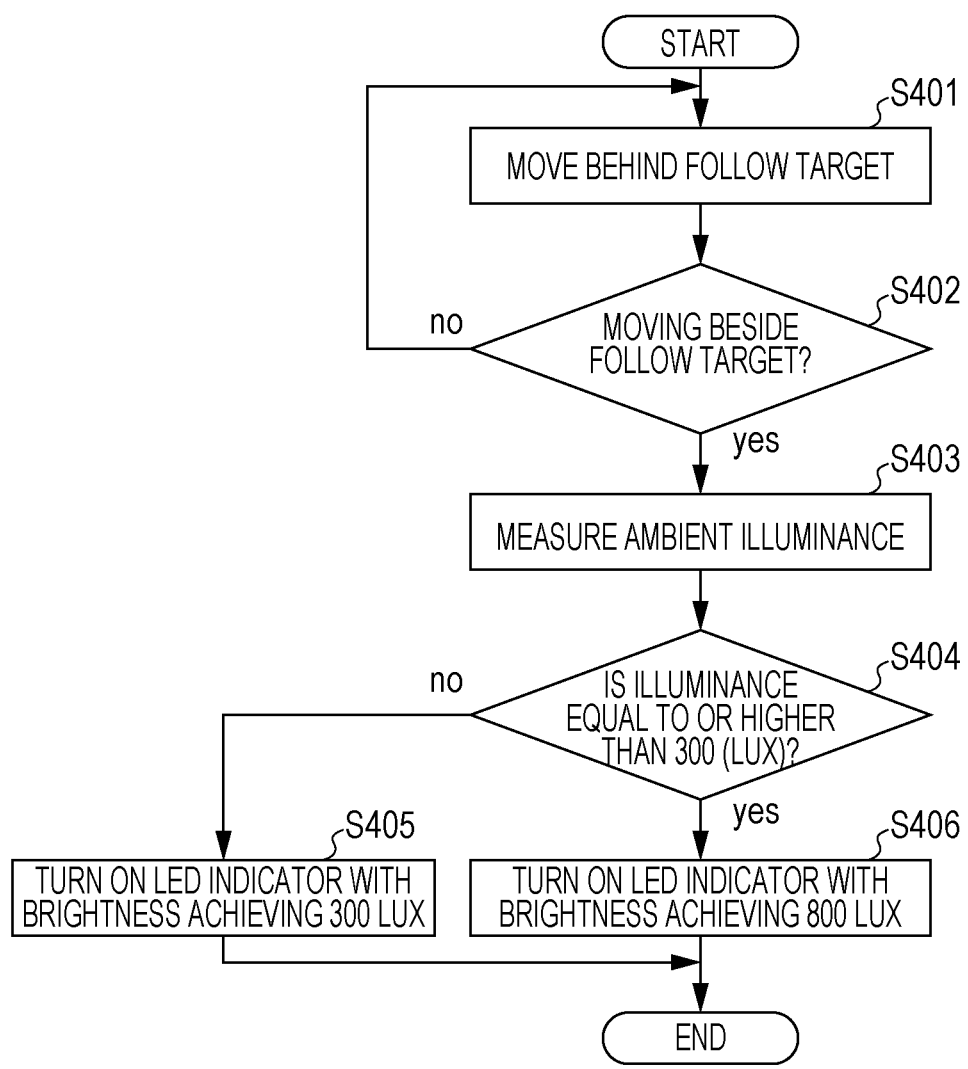
FIG. 21 is a flowchart for illustrating an example of turn-ON control for an LED indicator to be performed by the sound/light generating part.

If the ambient illuminance is high, the light output from the LED indicator 21 may fail to reach the follow target 1 even though the light is output with predetermined brightness. Therefore, the sound/light generating part 43 performs turn-ON control for the LED indicator 21 as illustrated in FIG. 21 to change the brightness of the light to be output depending on the ambient illuminance.

An example of the turn-ON control for the LED indicator is described with reference to a flowchart of FIG. 21.

If the autonomous moving apparatus 10 moves behind the follow target 1 (Step S401) but then moves beside the follow target 1 under the condition described above ("yes" in Step S402), the illuminance detecting part 46 measures an ambient illuminance (Step S403).

If the measured illuminance is lower than a preset value, for example, 300 (lux) ("no" in Step S404), the sound/light generating part 43 performs control so as to turn ON the LED indicator 21 with brightness achieving an illuminance of, for example, 300 (lux) when the light reaches the follow target 1 (Step S405).

If the measured illuminance is equal to or higher than the preset value, for example, 300 (lux) ("yes" in Step S404), the sound/light generating part 43 performs control so as to turn ON the LED indicator 21 with brightness achieving an illuminance of, for example, 800 (lux) when the light reaches the follow target 1 (Step S406).

The autonomous moving apparatus 10 of this exemplary embodiment measures the distance from the follow target and moves behind the follow target so that the distance from the follow target becomes a constant distance. If the distance from the follow target exceeds the preset followable distance for some reason, the autonomous moving apparatus 10 is set to stop its movement and stay at the stop position.

Figure 22:
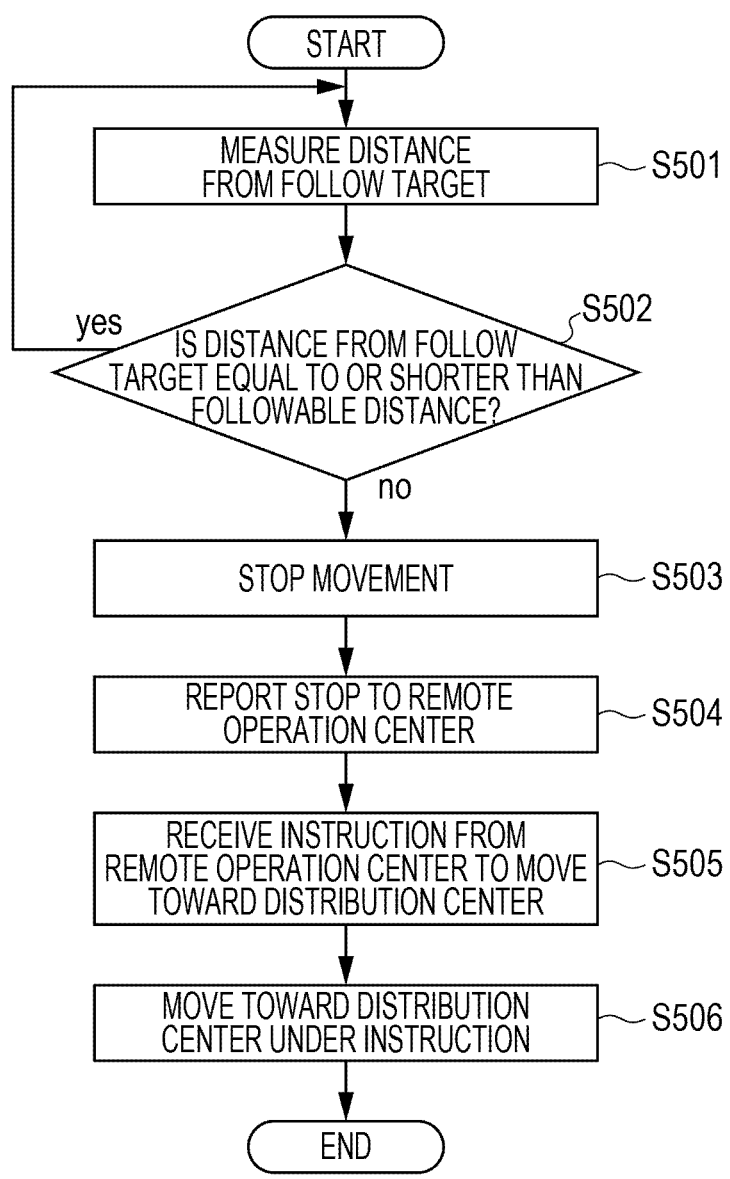
FIG. 22 is a flowchart for illustrating an operation to be performed when the autonomous moving apparatus has stopped its movement.

An operation of the autonomous moving apparatus 10 in this state is described with reference to a flowchart of FIG. 22.

The detecting part 41 measures the distance from the follow target while the autonomous moving apparatus 10 is moving so as to follow the movement of the follow target (Step S501).

If the measured distance from the follow target is equal to or shorter than the followable distance ("yes" in Step S502), the autonomous moving apparatus 10 continues the operation of following the follow target.

If the measured distance from the follow target is longer than the followable distance ("no" in Step S502), the control part 48 controls the moving part 50 to stop moving the autonomous moving apparatus 10 (Step S503). For example, the case in which the measured distance from the follow target is longer than the followable distance means that the measured distance from the follow target is longer than the followable distance for five seconds or longer continuously.

Figure 23:
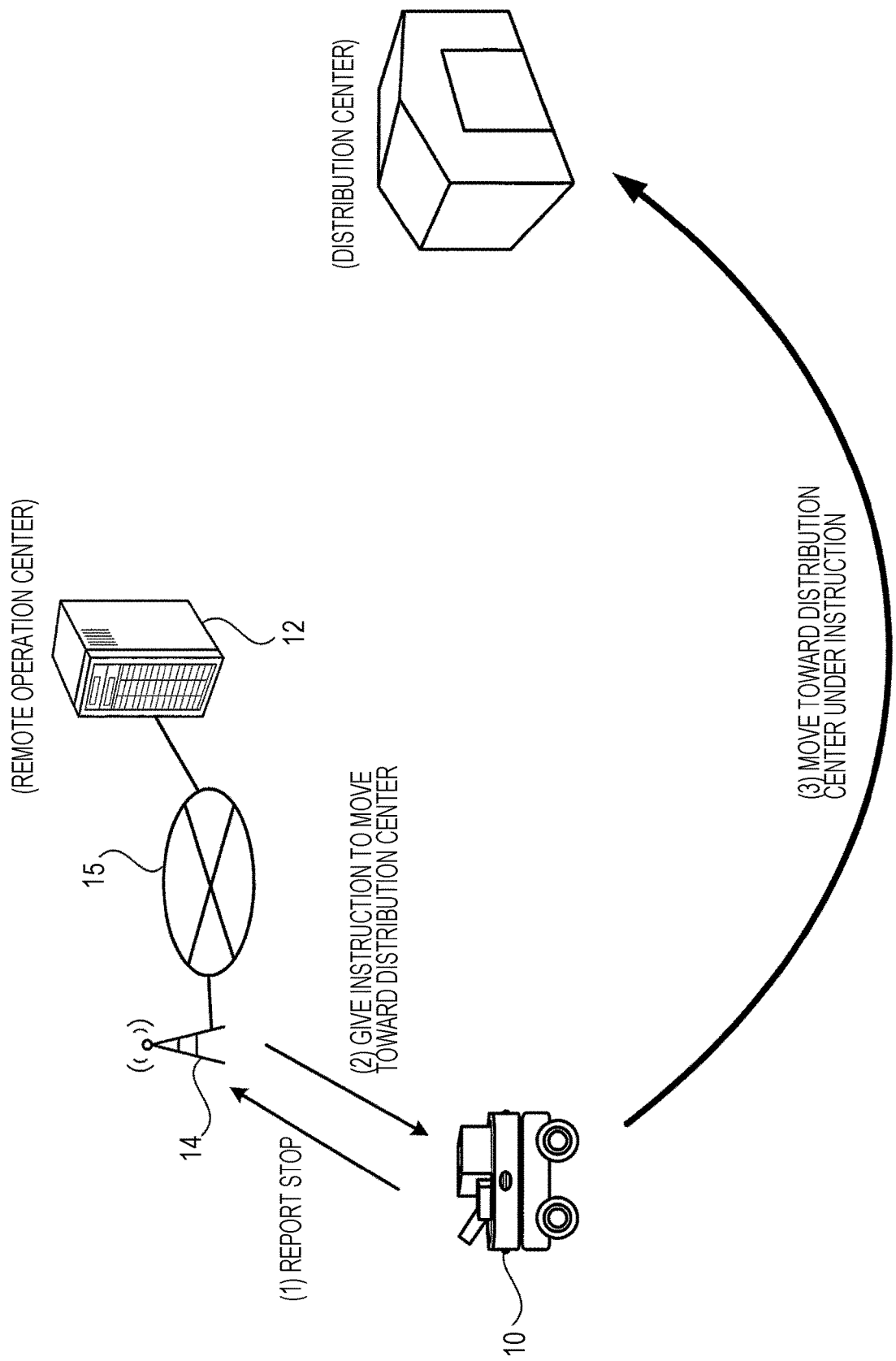
FIG. 23 illustrates a state in which the autonomous moving apparatus that has stopped its movement is recovered to a distribution center.

As illustrated in FIG. 23, the control part 48 reports, to the server 12 of the remote operation center via the data transmitting/receiving part 49, that the autonomous moving apparatus has stopped its movement (Step S504). When the report is given, the autonomous moving apparatus 10 transmits, to the server 12 of the remote operation center, positional information of the autonomous moving apparatus that is obtained by a GPS receiver (not illustrated) or the like.

The server 12 of the remote operation center that has received the report of the stop from the autonomous moving apparatus 10 selects a distribution center nearest to the position of the autonomous moving apparatus 10 that has stopped its movement and instructs the autonomous moving apparatus 10 to move toward the selected distribution center.

When the autonomous moving apparatus 10 receives the movement instruction from the server 12 of the remote operation center (Step S505), control is performed so that the autonomous moving apparatus 10 moves toward the distribution center under instruction (Step S506).

Through the series of processing operations, the autonomous moving apparatus 10 that has stopped its movement is recovered to the nearest distribution center.

If the follow target moves down to the roadway to pass around the obstacle on the sidewalk or cross the roadway and the autonomous moving apparatus 10 moves beside the follow target, however, the distance between the autonomous moving apparatus 10 and the follow target is likely to increase temporarily. Therefore, if it is determined whether the autonomous moving apparatus 10 may follow the follow target by using the followable distance in the normal state in which the autonomous moving apparatus 10 does not move beside the follow target, the autonomous moving apparatus 10 may stop its movement frequently.

In the autonomous moving apparatus 10 of this exemplary embodiment, the followable distance serving as the reference of the determination on whether to stop the movement is set longer in the state in which the autonomous moving apparatus 10 moves beside the follow target than in the normal state.

An example of the case in which the followable distance in the state in which the autonomous moving apparatus 10 moves beside the follow target is calculated based on the width of the sidewalk is described with reference to FIG. 24.

Figure 24:
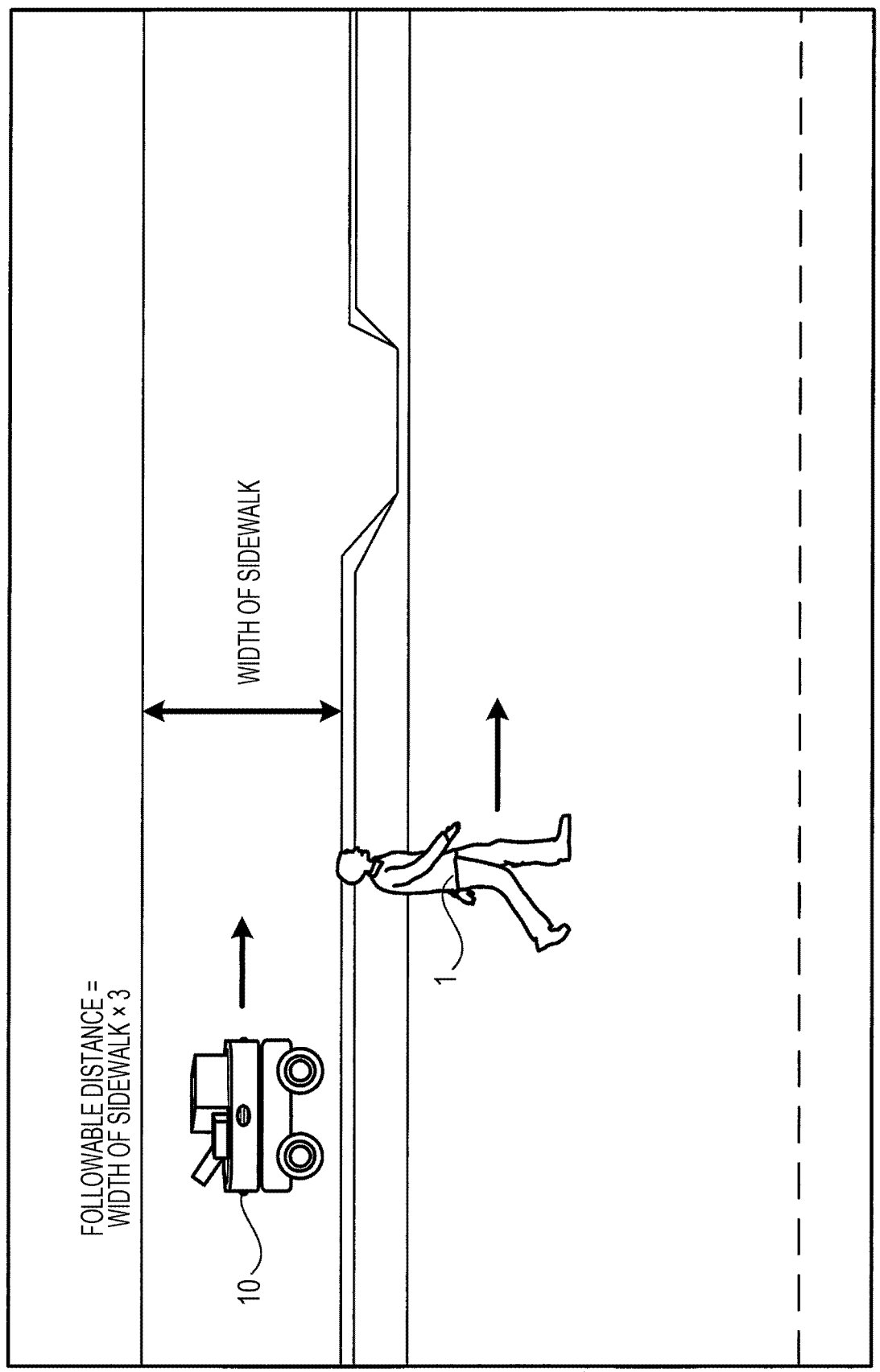
FIG. 24 illustrates an example in which a followable distance in a case in which the autonomous moving apparatus moves beside the follow target is calculated based on the width of the sidewalk.

In the example illustrated in FIG. 24, the autonomous moving apparatus 10 is moving along the sidewalk and the follow target 1 is walking along the roadway. Therefore, the autonomous moving apparatus 10 is moving beside the follow target 1. In the autonomous moving apparatus 10, the width of the sidewalk is measured and the followable distance is set to a value that is three times as large as the width of the sidewalk.

For example, if the width of the sidewalk is 1.2 m, the followable distance is set to 3.6 m (1.2 m×3).

In the autonomous moving apparatus 10, instead of calculating the followable distance based on the width of the sidewalk, the followable distance in the state in which the autonomous moving apparatus 10 does not move beside the follow target may be multiplied by a preset value and the resultant value may be set as the followable distance in the state in which the autonomous moving apparatus 10 moves beside the follow target.

For example, if the preset value is 3 and if the followable distance in the normal state is 1 m, the followable distance in the state in which the autonomous moving apparatus 10 moves beside the follow target is set to 3 m (1 m×3).

The exemplary embodiment described above is directed to the case in which the autonomous moving apparatus 10 performs the operation of following the follow target in the follow mode. The exemplary embodiment of the present disclosure may similarly be applied to the case in which the autonomous moving apparatus 10 performs the operation of moving ahead of the follow target in the lead mode.

Figure 25:
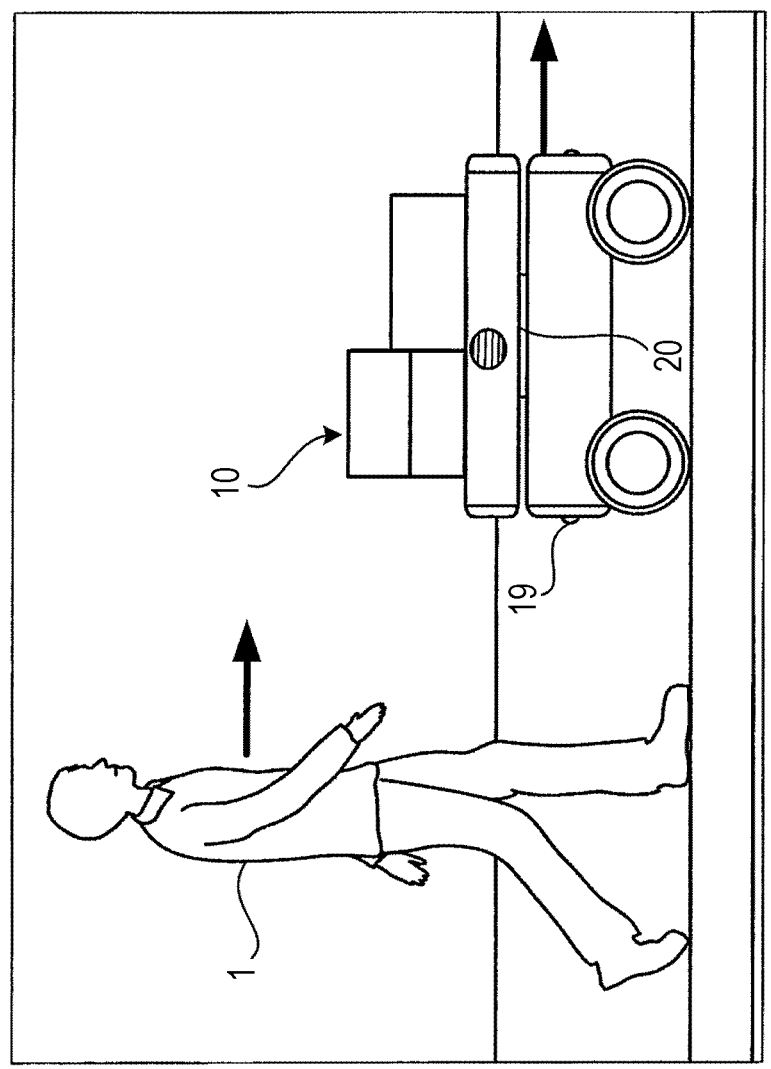
FIG. 25 illustrates a state in which the autonomous moving apparatus is moving ahead of the follow target in a lead mode.

In the lead mode, the autonomous moving apparatus 10 is moving ahead of the follow target 1 in the moving direction as illustrated in FIG. 25. If the follow target 1 moves down to the roadway in this state, it is necessary that the autonomous moving apparatus 10 also move down to the roadway to adjust the route of the autonomous moving apparatus to the route of the follow target 1. If the detecting part 41 detects the step, the autonomous moving apparatus 10 does not change the route. If the step is no longer detected, the autonomous moving apparatus 10 changes the route to move down to the roadway. Thus, the autonomous moving apparatus 10 continues the operation of moving ahead of the follow target 1 in the lead mode.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An autonomous moving apparatus, comprising:
   a moving unit that includes a wheel, a motor that drives the wheel, and an actuator that controls a steering angle, and a brake that together move the autonomous moving apparatus;
   a laser rangefinder that detects distances from surrounding objects and shapes of the surrounding objects; and
   a controller that controls the moving unit, wherein
   when a route of the autonomous moving apparatus is adjusted to a route of a follow target under control of the moving unit, the controller controls the moving unit so that the autonomous moving apparatus continues to move without changing the route of the autonomous moving apparatus if the follow target has changed the route but an obstacle having a possibility of causing a movement abnormality when the autonomous moving apparatus moves over the obstacle is present between the route of the follow target and the route of the autonomous moving apparatus,
   when the obstacle is no longer present between the route of the follow target and the route of the autonomous moving apparatus, the controller controls the moving unit so that the route of the autonomous moving apparatus is adjusted to the route of the follow target, and
   when a distance from the follow target is equal to or longer than a preset followable distance and the controller performs control so that the autonomous moving apparatus stops moving behind the follow target, the controller sets the followable distance to become longer in a case in which the autonomous moving apparatus moves beside the follow target without adjusting the route of the autonomous moving apparatus to the route of the follow target than in a case in which the route of the autonomous moving apparatus is identical to the route of the follow target.

2. The autonomous moving apparatus according to claim 1, further comprising:
   a camera that captures a surrounding image; and an image processor that acquires a condition of the follow target by processing the image captured by the camera, wherein, when the condition of the follow target that is acquired by the camera is a predetermined specific condition, the controller controls the moving unit so that the route of the autonomous moving apparatus is not adjusted to the route of the follow target even if the obstacle is no longer present between the route of the follow target and the route of the autonomous moving apparatus.

3. The autonomous moving apparatus according to claim 2, wherein, when the condition of the follow target is the predetermined specific condition before a start of adjustment of the route of the autonomous moving apparatus to the route of the follow target, the controller controls the moving unit so that the current route is maintained without changing the route.

4. The autonomous moving apparatus according to claim 2, wherein, when the condition of the follow target is the predetermined specific condition after a start of adjustment of the route of the autonomous moving apparatus to the route of the follow target, the controller controls the moving unit so that route changing is halted and the unchanged route is maintained.

5. The autonomous moving apparatus according to claim 2, wherein, when the condition of the follow target is the predetermined specific condition in a preset period before the follow target changes the route, the controller controls the moving unit so that the route of the autonomous moving apparatus is not adjusted to the route of the follow target even if the follow target has changed the route.

6. The autonomous moving apparatus according to claim 2, wherein, when the condition of the follow target becomes the predetermined specific condition in a preset period after the follow target has changed the route, the controller controls the moving unit so that, if the route of the autonomous moving apparatus has not been changed, the current route is maintained without changing the route and so that, if the route of the autonomous moving apparatus has already been changed, a changed route is maintained.

7. The autonomous moving apparatus according to claim 2, wherein the predetermined condition of the follow target is a condition in which the follow target performs a specific action with a hand.

8. The autonomous moving apparatus according to claim 1, wherein the autonomous moving apparatus generates, when the autonomous moving apparatus is moving beside the follow target without adjusting the route of the autonomous moving apparatus to the route of the follow target, sound or light indicating that the autonomous moving apparatus is moving beside the follow target.

9. The autonomous moving apparatus according to claim 8, further comprising a sound detector that detects an ambient noise level, wherein the autonomous moving apparatus generates the sound indicating that the autonomous moving apparatus is moving beside the follow target at a sound level determined based on the noise level detected by the sound detector.

10. The autonomous moving apparatus according to claim 8, further comprising an illuminance detector that detects an ambient illuminance, wherein the autonomous moving apparatus generates the light indicating that the autonomous moving apparatus is moving beside the follow target with brightness determined based on the illuminance detected by the illuminance detector.

11. The autonomous moving apparatus according to claim 1, wherein the controller calculates the followable distance in the case in which the autonomous moving apparatus moves beside the follow target based on a width of a sidewalk where the autonomous moving apparatus is moving.

12. The autonomous moving apparatus according to claim 1, wherein the controller controls the moving unit so as to determine whether to adjust the route of the autonomous moving apparatus to the route of the follow target depending on whether a height or a width of the obstacle is equal to or larger than a preset height or a preset width.

13. The autonomous moving apparatus according to claim 12, wherein, when the height or the width of the obstacle is equal to or larger than the preset height or the preset width, the controller controls the moving unit so that the route of the autonomous moving apparatus is not adjusted to the route of the follow target.

14. A non-transitory computer readable medium storing a program causing a computer to execute a process comprising:

when a route of an autonomous moving apparatus is adjusted to a route of a follow target under control of a moving unit that includes a wheel, a motor that drives the wheel, and an actuator that controls a steering angle, and a brake that together moves the autonomous moving apparatus, causing the autonomous moving apparatus to continue to move without changing the route of the autonomous moving apparatus if the follow target has changed the route but an obstacle having a possibility of causing a movement abnormality when the autonomous moving apparatus moves over the obstacle is present between the route of the follow target and the route of the autonomous moving apparatus;

adjusting the route of the autonomous moving apparatus to the route of the follow target when the obstacle is no longer present between the route of the follow target and the route of the autonomous moving apparatus; and when a distance from the follow target is equal to or longer than a preset followable distance and the autonomous moving apparatus is controlled to stop moving behind the follow target, setting the followable distance to become longer in a case in which the autonomous moving apparatus moves beside the follow target without adjusting the route of the autonomous moving apparatus to the route of the follow target than in a case in which the route of the autonomous moving apparatus is identical to the route of the follow target.

15. An autonomous moving apparatus, comprising:

moving means for moving the autonomous moving apparatus;

detecting means for detecting distances from surrounding objects and shapes of the surrounding objects; and control means for controlling the moving means, wherein when a route of the autonomous moving apparatus is adjusted to a route of a follow target under control of the moving means, the control means controls the moving means so that the autonomous moving apparatus continues to move without changing the route of the autonomous moving apparatus if the follow target has changed the route but an obstacle having a possibility of causing a movement abnormality when the autonomous moving apparatus moves over the obstacle is present between the route of the follow target and the route of the autonomous moving apparatus, when the obstacle is no longer present between the route of the follow target and the route of the autonomous moving apparatus, the control means controls the moving means so that the route of the autonomous moving apparatus is adjusted to the route of the follow target, and when a distance from the follow target is equal to or longer than a preset followable distance and the controller performs control so that the autonomous moving apparatus stops moving behind the follow target, the controller sets the followable distance to become longer in a case in which the autonomous moving apparatus moves beside the follow target without adjusting the route of the autonomous moving apparatus to the route of the follow target than in a case in which the route of the autonomous moving apparatus is identical to the route of the follow target.

\* \* \* \* \*